US011829967B2

(12) United States Patent
Davey et al.

(10) Patent No.: US 11,829,967 B2
(45) Date of Patent: Nov. 28, 2023

(54) BILL PAY SERVICE WITH FEDERATED DIRECTORY MODEL SUPPORT

(71) Applicant: The Clearing House Payments Company, New York, NY (US)

(72) Inventors: Peter Davey, Powhatan, VA (US); Stephen Ledford, Winterville, GA (US)

(73) Assignee: The Clearing House Payments Company L.L.C., New York, NY (US)

( * ) Notice: Subject to any disclaimer, the term of this patent is extended or adjusted under 35 U.S.C. 154(b) by 0 days.

(21) Appl. No.: 17/929,107

(22) Filed: Sep. 1, 2022

(65) Prior Publication Data

US 2023/0075787 A1    Mar. 9, 2023

Related U.S. Application Data

(63) Continuation of application No. 15/970,058, filed on May 3, 2018, now Pat. No. 11,436,577.

(51) Int. Cl.
*G06Q 20/10* (2012.01)
*G06Q 20/02* (2012.01)

(52) U.S. Cl.
CPC .......... *G06Q 20/102* (2013.01); *G06Q 20/02* (2013.01); *G06Q 20/108* (2013.01)

(58) Field of Classification Search
CPC .................................................. G06Q 20/102
See application file for complete search history.

(56) References Cited

U.S. PATENT DOCUMENTS 3,852,571 A    12/1974  Hal et al.
4,201,978 A    5/1980   Nally
(Continued)

FOREIGN PATENT DOCUMENTS

CA    2131667 A1    6/1995
EP    0 029 733 A2  6/1981
(Continued)

OTHER PUBLICATIONS

Caron, in "Evolving Payments Landscape," in IEEE Computer Society, 2018 (Year: 2018).*

(Continued)

*Primary Examiner* — Olabode Akintola
*Assistant Examiner* — Brandon M Duck
(74) *Attorney, Agent, or Firm* — Merchant & Gould P.C.

(57) ABSTRACT

A method, system, apparatus, and computer program for conducting a real-time payment settlement transaction. The method receiving a request for endpoint data, and, in response to receiving the request, determining whether one or more directories, among a plurality of directories, can provide the endpoint data requested in the request. The method also includes identifying at least one directory, among the directories determined to be able to provide the endpoint data requested in the request, as a selection for providing the endpoint data, and obtaining the endpoint data from the at least one directory identified in the identifying. In one example embodiment, the endpoint data includes an account number of a payee account and a routing number of a payee entity. A payment message or a request for payment message can be routed using the obtained endpoint data.

20 Claims, 7 Drawing Sheets

(56) References Cited

U.S. PATENT DOCUMENTS

| | | |
|---|---|---|
| 4,205,780 A | 6/1980 | Burns et al. |
| 4,264,808 A | 4/1981 | Owens et al. |
| 4,268,715 A | 5/1981 | Atalla |
| 4,270,042 A | 5/1981 | Case |
| 4,321,672 A | 3/1982 | Braun et al. |
| 4,326,258 A | 4/1982 | de la Guardia |
| 4,404,649 A | 9/1983 | Nunley et al. |
| 4,417,136 A | 11/1983 | Rushby et al. |
| 4,457,015 A | 6/1984 | Nally et al. |
| 4,491,725 A | 1/1985 | Pritchard |
| 4,500,750 A | 2/1985 | Elander et al. |
| 4,523,330 A | 6/1985 | Cain |
| 4,555,617 A | 11/1985 | Brooks et al. |
| 4,578,530 A | 3/1986 | Zeidler |
| 4,602,936 A | 7/1986 | Topfl et al. |
| 4,617,457 A | 10/1986 | Granzow et al. |
| 4,652,990 A | 3/1987 | Pailen et al. |
| 4,672,377 A | 6/1987 | Murphy et al. |
| 4,673,802 A | 6/1987 | Ohmae et al. |
| 4,675,815 A | 6/1987 | Kuroki et al. |
| 4,680,803 A | 7/1987 | Dilella |
| 4,694,147 A | 9/1987 | Amemiya et al. |
| 4,723,283 A | 2/1988 | Nagasawa et al. |
| 4,745,267 A | 5/1988 | Davis et al. |
| 4,747,058 A | 5/1988 | Ho |
| 4,748,557 A | 5/1988 | Tamada et al. |
| 4,750,201 A | 6/1988 | Hodgson et al. |
| 4,755,940 A | 7/1988 | Brachtl et al. |
| 4,757,543 A | 7/1988 | Tamada et al. |
| 4,758,530 A | 7/1988 | Schubert |
| 4,771,460 A | 9/1988 | Tamada et al. |
| 4,799,156 A | 1/1989 | Shavit et al. |
| 4,810,866 A | 3/1989 | Lord, Jr. |
| 4,823,264 A | 4/1989 | Deming |
| 4,843,220 A | 6/1989 | Haun |
| 4,858,121 A | 8/1989 | Barber et al. |
| 4,882,779 A | 11/1989 | Rahtgen |
| 4,888,812 A | 12/1989 | Dinan et al. |
| 4,910,774 A | 3/1990 | Barakat |
| 4,912,762 A | 3/1990 | Lee et al. |
| 4,922,503 A | 5/1990 | Leone |
| 4,926,325 A | 5/1990 | Benton et al. |
| 4,941,125 A | 7/1990 | Boyne |
| 4,960,981 A | 10/1990 | Benton et al. |
| 4,961,142 A | 10/1990 | Elliott et al. |
| 4,962,531 A | 10/1990 | Sipman et al. |
| 4,977,595 A | 12/1990 | Ohta et al. |
| 4,985,921 A | 1/1991 | Schwartz |
| 5,003,594 A | 3/1991 | Shinagawa |
| 5,014,311 A | 5/1991 | Schrenk |
| 5,016,277 A | 5/1991 | Hamilton |
| 5,053,607 A | 10/1991 | Carlson et al. |
| 5,054,096 A | 10/1991 | Beizer |
| 5,081,680 A | 1/1992 | Bennett |
| 5,091,968 A | 2/1992 | Higgins et al. |
| 5,093,787 A | 3/1992 | Simmons |
| 5,095,480 A | 3/1992 | Fenner |
| 5,111,395 A | 5/1992 | Smith et al. |
| 5,122,950 A | 6/1992 | Benton et al. |
| 5,123,047 A | 6/1992 | Rosenow |
| 5,144,115 A | 9/1992 | Yoshida |
| 5,159,548 A | 10/1992 | Caslavka |
| 5,159,592 A | 10/1992 | Perkins |
| 5,163,098 A | 11/1992 | Dahbura |
| 5,168,444 A | 12/1992 | Cukor et al. |
| 5,170,466 A | 12/1992 | Rogan et al. |
| 5,173,594 A | 12/1992 | McClure |
| 5,175,682 A | 12/1992 | Higashiyama et al. |
| 5,175,766 A | 12/1992 | Hamilton |
| 5,185,798 A | 2/1993 | Hamada et al. |
| 5,187,750 A | 2/1993 | Behera |
| 5,195,133 A | 3/1993 | Kapp et al. |
| 5,198,975 A | 3/1993 | Baker et al. |
| 5,200,993 A | 4/1993 | Wheeler et al. |
| 5,204,811 A | 4/1993 | Bednar et al. |
| 5,214,697 A | 5/1993 | Saito |
| 5,220,501 A | 6/1993 | Lawlor et al. |
| 5,231,569 A | 7/1993 | Myatt et al. |
| 5,233,547 A | 8/1993 | Kapp et al. |
| 5,233,656 A | 8/1993 | Langrand et al. |
| 5,235,433 A | 8/1993 | Clarkson et al. |
| 5,237,158 A | 8/1993 | Kern et al. |
| 5,237,159 A | 8/1993 | Stephens et al. |
| 5,237,620 A | 8/1993 | Deaton et al. |
| 5,241,600 A | 8/1993 | Hillis |
| 5,256,863 A | 10/1993 | Ferguson et al. |
| 5,259,025 A | 11/1993 | Monroe et al. |
| 5,262,942 A | 11/1993 | Earle |
| 5,265,007 A | 11/1993 | Barnhard, Jr. et al. |
| 5,274,567 A | 12/1993 | Kallin et al. |
| 5,283,829 A | 2/1994 | Anderson |
| 5,287,497 A | 2/1994 | Behera |
| 5,317,637 A | 5/1994 | Pichlmaier et al. |
| 5,321,238 A | 6/1994 | Kamata et al. |
| 5,321,751 A | 6/1994 | Ray et al. |
| 5,321,816 A | 6/1994 | Rogan et al. |
| 5,326,959 A | 7/1994 | Perazza |
| 5,329,589 A | 7/1994 | Fraser et al. |
| 5,337,358 A | 8/1994 | Axelrod et al. |
| 5,341,428 A | 8/1994 | Schatz |
| 5,343,529 A | 8/1994 | Goldfine et al. |
| 5,345,090 A | 9/1994 | Hludzinski |
| 5,373,550 A | 12/1994 | Campbell et al. |
| 5,383,113 A | 1/1995 | Kight et al. |
| 5,396,558 A | 3/1995 | Ishiguro et al. |
| 5,408,531 A | 4/1995 | Nakajima |
| 5,412,190 A | 5/1995 | Josephson et al. |
| 5,426,281 A | 6/1995 | Abecassis |
| 5,434,928 A | 7/1995 | Wagner et al. |
| 5,436,970 A | 7/1995 | Ray et al. |
| 5,440,634 A | 8/1995 | Jones et al. |
| 5,444,794 A | 8/1995 | Uhland, Sr. |
| 5,446,796 A | 8/1995 | Ishiguro et al. |
| 5,453,601 A | 9/1995 | Rosen |
| 5,454,575 A | 10/1995 | Del Buono |
| 5,455,407 A | 10/1995 | Rosen |
| 5,457,747 A | 10/1995 | Drexler et al. |
| 5,465,206 A | 11/1995 | Hilt et al. |
| 5,473,143 A | 12/1995 | Vak et al. |
| 5,479,510 A | 12/1995 | Olsen et al. |
| 5,484,988 A | 1/1996 | Hills et al. |
| 5,502,765 A | 3/1996 | Ishiguro et al. |
| 5,506,691 A | 4/1996 | Bednar et al. |
| 5,523,167 A | 6/1996 | Hunt et al. |
| 5,524,073 A | 6/1996 | Stambler |
| 5,528,705 A | 6/1996 | Reasoner, Jr. et al. |
| 5,532,464 A | 7/1996 | Josephson et al. |
| 5,539,822 A | 7/1996 | Lett |
| 5,539,825 A | 7/1996 | Akiyama et al. |
| 5,544,043 A | 8/1996 | Miki et al. |
| 5,544,255 A | 8/1996 | Smithies et al. |
| 5,557,518 A | 9/1996 | Roser |
| 5,577,121 A | 11/1996 | Davis et al. |
| 5,590,038 A | 12/1996 | Pitroda |
| 5,594,226 A | 1/1997 | Steger |
| 5,596,642 A | 1/1997 | Davis et al. |
| 5,602,933 A | 2/1997 | Blackwell et al. |
| 5,602,936 A | 2/1997 | Green et al. |
| 5,604,640 A | 2/1997 | Zipf et al. |
| 5,604,802 A | 2/1997 | Holloway |
| 5,608,800 A | 3/1997 | Hoffmann et al. |
| 5,613,001 A | 3/1997 | Bakhoum |
| 5,615,269 A | 3/1997 | Micali |
| 5,621,796 A | 4/1997 | Davis et al. |
| 5,621,797 A | 4/1997 | Rosen |
| 5,623,547 A | 4/1997 | Jones et al. |
| 5,625,694 A | 4/1997 | Lee et al. |
| 5,629,981 A | 5/1997 | Nerlikar |
| 5,633,930 A | 5/1997 | Davis et al. |
| 5,642,419 A | 6/1997 | Rosen |
| 5,647,017 A | 7/1997 | Smithies et al. |
| 5,649,116 A | 7/1997 | McCoy et al. |
| 5,649,117 A | 7/1997 | Landry |
| 5,652,786 A | 7/1997 | Rogers |

(56) References Cited

U.S. PATENT DOCUMENTS

| | | |
|---|---|---|
| 5,657,389 A | 8/1997 | Houvener |
| 5,657,396 A | 8/1997 | Rudolph et al. |
| 5,659,616 A | 8/1997 | Sudia |
| 5,668,897 A | 9/1997 | Stolfo |
| 5,673,333 A | 9/1997 | Johnston |
| 5,677,955 A | 10/1997 | Doggett et al. |
| 5,682,549 A | 10/1997 | Tanaka et al. |
| 5,684,965 A | 11/1997 | Pickering |
| 5,691,524 A | 11/1997 | Josephson |
| 5,699,528 A | 12/1997 | Hogan |
| 5,703,344 A | 12/1997 | Bezy et al. |
| 5,708,810 A | 1/1998 | Kern et al. |
| 5,710,887 A | 1/1998 | Chelliah et al. |
| 5,715,298 A | 2/1998 | Rogers |
| 5,717,868 A | 2/1998 | James |
| 5,732,400 A | 3/1998 | Mandler et al. |
| 5,742,668 A | 4/1998 | Pepe et al. |
| 5,742,888 A | 4/1998 | Fuchiwaki et al. |
| 5,751,842 A | 5/1998 | Riach et al. |
| 5,754,673 A | 5/1998 | Brooks et al. |
| 5,760,916 A | 6/1998 | Dellert et al. |
| 5,778,178 A | 7/1998 | Arunachalam |
| 5,781,654 A | 7/1998 | Carney |
| 5,783,808 A | 7/1998 | Josephson |
| 5,784,503 A | 7/1998 | Bleecker, III et al. |
| 5,784,610 A | 7/1998 | Copeland, III et al. |
| 5,787,403 A | 7/1998 | Randle |
| 5,790,260 A | 8/1998 | Myers |
| 5,790,790 A | 8/1998 | Smith et al. |
| 5,793,869 A | 8/1998 | Claflin, Jr. |
| 5,832,460 A | 11/1998 | Bednar et al. |
| 5,832,463 A | 11/1998 | Funk |
| 5,832,464 A | 11/1998 | Houvener et al. |
| 5,848,400 A | 12/1998 | Chang |
| 5,857,034 A | 1/1999 | Tsuchiya et al. |
| 5,870,456 A | 2/1999 | Rogers |
| 5,870,724 A | 2/1999 | Lawlor et al. |
| 5,870,725 A | 2/1999 | Bellinger et al. |
| 5,873,072 A | 2/1999 | Kight et al. |
| 5,884,271 A | 3/1999 | Pitroda |
| 5,893,080 A | 4/1999 | McGurl et al. |
| 5,903,874 A | 5/1999 | Leonard et al. |
| 5,903,880 A | 5/1999 | Biffar |
| 5,903,881 A | 5/1999 | Schrader et al. |
| 5,910,988 A | 6/1999 | Ballard |
| 5,915,023 A | 6/1999 | Bernstein |
| 5,917,965 A | 6/1999 | Cahill et al. |
| 5,920,847 A | 7/1999 | Kolling et al. |
| 5,925,865 A | 7/1999 | Steger |
| 5,926,288 A | 7/1999 | Dellert et al. |
| 5,930,778 A | 7/1999 | Geer |
| 5,937,396 A | 8/1999 | Konya |
| 5,940,844 A | 8/1999 | Cahill et al. |
| 5,956,700 A | 9/1999 | Landry |
| 5,963,647 A | 10/1999 | Downing et al. |
| 5,963,925 A | 10/1999 | Kolling et al. |
| 5,973,731 A | 10/1999 | Schwab |
| 5,978,780 A | 11/1999 | Watson |
| 5,987,500 A | 11/1999 | Arunachalam |
| 5,999,625 A | 12/1999 | Bellare et al. |
| 6,006,208 A | 12/1999 | Forst et al. |
| 6,021,202 A | 2/2000 | Anderson et al. |
| 6,029,150 A | 2/2000 | Kravitz |
| 6,029,151 A | 2/2000 | Nikander |
| 6,032,133 A | 2/2000 | Hilt et al. |
| 6,032,137 A | 2/2000 | Ballard |
| 6,036,344 A | 3/2000 | Goldenberg |
| 6,047,051 A | 4/2000 | Ginzboorg et al. |
| 6,049,785 A | 4/2000 | Gifford |
| 6,049,786 A | 4/2000 | Smorodinsky |
| 6,055,567 A | 4/2000 | Ganesan et al. |
| 6,058,382 A | 5/2000 | Kasai et al. |
| 6,069,896 A | 5/2000 | Borgstahl et al. |
| 6,070,150 A | 5/2000 | Remington et al. |
| 6,076,068 A | 6/2000 | DeLapa et al. |
| 6,076,074 A | 6/2000 | Cotton et al. |
| 6,108,104 A | 8/2000 | Tesavis |
| 6,115,509 A | 9/2000 | Yeskel |
| 6,138,107 A | 10/2000 | Elgamal |
| 6,145,738 A | 11/2000 | Stinson et al. |
| 6,173,272 B1 | 1/2001 | Thomas et al. |
| 6,181,837 B1 | 1/2001 | Cahill et al. |
| 6,189,785 B1 | 2/2001 | Lowery |
| 6,192,142 B1 | 2/2001 | Pare, Jr. et al. |
| 6,192,407 B1 | 2/2001 | Smith et al. |
| 6,199,077 B1 | 3/2001 | Inala et al. |
| 6,202,054 B1 | 3/2001 | Lawlor et al. |
| 6,209,095 B1 | 3/2001 | Anderson et al. |
| 6,212,556 B1 | 4/2001 | Arunachalam |
| 6,223,168 B1 | 4/2001 | McGurl et al. |
| 6,230,148 B1 | 5/2001 | Pare, Jr. et al. |
| 6,243,689 B1 | 6/2001 | Norton |
| 6,260,024 B1 | 7/2001 | Shkedy |
| 6,269,348 B1 | 7/2001 | Pare, Jr. et al. |
| 6,278,993 B1 | 8/2001 | Kumar et al. |
| 6,282,523 B1 | 8/2001 | Tedesco et al. |
| 6,283,366 B1 | 9/2001 | Hills et al. |
| 6,285,991 B1 | 9/2001 | Powar |
| 6,289,322 B1 | 9/2001 | Kitchen et al. |
| 6,292,789 B1 | 9/2001 | Schutzer |
| 6,301,379 B1 | 10/2001 | Thompson et al. |
| 6,304,857 B1 | 10/2001 | Heindel et al. |
| 6,317,745 B1 | 11/2001 | Thomas et al. |
| 6,317,783 B1 | 11/2001 | Freishtat et al. |
| 6,324,526 B1 | 11/2001 | D'Agostino |
| 6,327,577 B1 | 12/2001 | Garrison et al. |
| 6,330,544 B1 | 12/2001 | Walker et al. |
| 6,334,116 B1 | 12/2001 | Ganesan et al. |
| 6,338,050 B1 | 1/2002 | Conklin et al. |
| 6,351,553 B1 | 2/2002 | Hayosh |
| 6,353,811 B1 | 3/2002 | Weissman |
| 6,363,362 B1 | 3/2002 | Burfield et al. |
| 6,385,595 B1 | 5/2002 | Kolling et al. |
| 6,385,652 B1 | 5/2002 | Brown et al. |
| 6,405,245 B1 | 6/2002 | Burson et al. |
| 6,408,284 B1 | 6/2002 | Hilt et al. |
| 6,411,939 B1 | 6/2002 | Parsons |
| 6,412,073 B1 | 6/2002 | Rangan |
| 6,438,527 B1 | 8/2002 | Powar |
| 6,442,590 B1 | 8/2002 | Inala et al. |
| 6,477,565 B1 | 11/2002 | Daswani et al. |
| 6,493,685 B1 | 12/2002 | Ensel et al. |
| 6,510,451 B2 | 1/2003 | Wu et al. |
| 6,517,587 B2 | 2/2003 | Satyavolu et al. |
| 6,553,346 B1 | 4/2003 | Walker et al. |
| 6,567,850 B1 | 5/2003 | Freishtat et al. |
| 6,574,377 B1 | 6/2003 | Cahill et al. |
| 6,578,015 B1 | 6/2003 | Haseltine et al. |
| 6,594,647 B1 | 7/2003 | Randle et al. |
| 6,594,766 B2 | 7/2003 | Rangan et al. |
| 6,633,910 B1 | 10/2003 | Rajan et al. |
| 6,647,376 B1 | 11/2003 | Farrar et al. |
| 6,678,664 B1 | 1/2004 | Ganesan |
| 6,694,300 B1 | 2/2004 | Walker et al. |
| 6,725,425 B1 | 4/2004 | Rajan et al. |
| 6,738,804 B1 | 5/2004 | Lo |
| 6,748,367 B1 | 6/2004 | Lee |
| 6,802,042 B2 | 10/2004 | Rangan et al. |
| 6,826,545 B2 | 11/2004 | Kawashima et al. |
| 6,842,782 B1 | 1/2005 | Malik et al. |
| 6,856,974 B1 | 2/2005 | Ganesan et al. |
| 6,856,975 B1 | 2/2005 | Inglis |
| 6,859,212 B2 | 2/2005 | Kumar et al. |
| 6,863,214 B2 | 3/2005 | Garner, IV et al. |
| 6,865,680 B1 | 3/2005 | Wu et al. |
| 6,871,220 B1 | 3/2005 | Rajan et al. |
| 6,910,023 B1 | 6/2005 | Schibi |
| 6,932,268 B1 | 8/2005 | McCoy et al. |
| 6,934,691 B1 | 8/2005 | Simpson et al. |
| 6,945,453 B1 | 9/2005 | Schwarz, Jr. |
| 6,948,063 B1 | 9/2005 | Ganesan et al. |
| 6,968,319 B1 | 11/2005 | Remington et al. |
| 6,980,973 B1 | 12/2005 | Karpenko |
| 6,996,542 B1 | 2/2006 | Landry |

(56) References Cited

U.S. PATENT DOCUMENTS

| | | |
|---|---|---|
| 7,004,382 B2 | 2/2006 | Sandru |
| 7,013,310 B2 | 3/2006 | Messing et al. |
| 7,028,008 B2 | 4/2006 | Powar |
| 7,028,886 B1 | 4/2006 | Maloney |
| 7,039,656 B1 | 5/2006 | Tsai et al. |
| 7,076,458 B2 | 7/2006 | Lawlor et al. |
| 7,085,997 B1 | 8/2006 | Wu et al. |
| 7,089,208 B1 | 8/2006 | Levchin et al. |
| 7,099,845 B2 | 8/2006 | Higgins et al. |
| 7,107,244 B2 | 9/2006 | Kight et al. |
| 7,110,969 B1 | 9/2006 | Bennett et al. |
| 7,110,993 B2 | 9/2006 | Soulanille et al. |
| 7,120,602 B2 | 10/2006 | Kitchen et al. |
| 7,146,338 B2 | 12/2006 | Kight et al. |
| 7,155,508 B2 | 12/2006 | Sankuratripati et al. |
| 7,158,955 B2 | 1/2007 | Diveley et al. |
| 7,165,052 B2 | 1/2007 | Diveley et al. |
| 7,165,723 B2 | 1/2007 | McGlamery et al. |
| 7,167,711 B1 | 1/2007 | Dennis |
| 7,175,074 B2 | 2/2007 | Mejias et al. |
| 7,177,846 B2 | 2/2007 | Moenickheim et al. |
| 7,178,096 B2 | 2/2007 | Rangan et al. |
| 7,181,430 B1 | 2/2007 | Buchanan et al. |
| 7,191,150 B1 | 3/2007 | Shao et al. |
| 7,191,151 B1 | 3/2007 | Nosek |
| 7,200,551 B1 | 4/2007 | Senez |
| 7,200,804 B1 | 4/2007 | Khavari et al. |
| 7,203,845 B2 | 4/2007 | Sokolic et al. |
| 7,213,003 B1 | 5/2007 | Kight et al. |
| 7,225,156 B2 | 5/2007 | Fisher et al. |
| 7,225,464 B2 | 5/2007 | Satyavolu et al. |
| 7,236,950 B2 | 6/2007 | Savage et al. |
| 7,240,031 B1 | 7/2007 | Kight et al. |
| 7,249,080 B1 | 7/2007 | Hoffman et al. |
| 7,249,094 B2 | 7/2007 | Levchin et al. |
| 7,251,656 B2 | 7/2007 | Keown et al. |
| 7,263,548 B2 | 8/2007 | Daswani et al. |
| 7,296,004 B1 | 11/2007 | Garrison et al. |
| 7,302,408 B2 | 11/2007 | Engdahl et al. |
| 7,302,411 B2 | 11/2007 | Ganesan et al. |
| 7,308,426 B2 | 12/2007 | Pitroda |
| 7,313,813 B2 | 12/2007 | Rangan et al. |
| 7,321,874 B2 | 1/2008 | Dilip et al. |
| 7,321,875 B2 | 1/2008 | Dilip et al. |
| 7,330,831 B2 | 2/2008 | Biondi et al. |
| 7,334,128 B2 | 2/2008 | Ganesan et al. |
| 7,356,502 B1 | 4/2008 | LaBadie et al. |
| 7,366,696 B1 | 4/2008 | Ganesan et al. |
| 7,366,697 B2 | 4/2008 | Kitchen et al. |
| 7,370,014 B1 | 5/2008 | Vasavada et al. |
| 7,383,223 B1 | 6/2008 | Dilip et al. |
| 7,383,226 B2 | 6/2008 | Kight et al. |
| 7,392,223 B1 | 6/2008 | Ganesan et al. |
| 7,395,319 B2 | 7/2008 | Harris et al. |
| 7,415,610 B2 | 8/2008 | Ganesan et al. |
| 7,424,520 B2 | 9/2008 | Daswani et al. |
| 7,426,638 B2 | 9/2008 | Ganesan et al. |
| 7,447,347 B2 | 11/2008 | Weber |
| 7,474,779 B2 | 1/2009 | Duncan |
| 7,490,063 B2 | 2/2009 | Garrison et al. |
| 7,502,749 B2 | 3/2009 | Ganesan et al. |
| 7,505,937 B2 | 3/2009 | Dilip et al. |
| 7,526,448 B2 | 4/2009 | Zielke et al. |
| 7,533,058 B2 | 5/2009 | Kulakowski |
| 7,536,340 B2 | 5/2009 | Dheer et al. |
| 7,558,795 B2 | 7/2009 | Malik et al. |
| 7,606,752 B2 | 10/2009 | Hazlehurst et al. |
| 7,606,787 B2 | 10/2009 | Keown et al. |
| 7,610,245 B2 | 10/2009 | Dent et al. |
| 7,636,686 B2 | 12/2009 | Pierdinock et al. |
| 7,636,688 B2 | 12/2009 | Kitchen et al. |
| 7,640,197 B1 | 12/2009 | Gentry et al. |
| 7,644,023 B2 | 1/2010 | Kumar et al. |
| 7,644,036 B2 | 1/2010 | McCoy et al. |
| 7,653,598 B1 | 1/2010 | Hamilton et al. |
| 7,657,484 B2 | 2/2010 | Ganesan et al. |
| 7,660,766 B1 | 2/2010 | Lawson et al. |
| 7,672,879 B1 | 3/2010 | Kumar et al. |
| 7,685,525 B2 | 3/2010 | Kumar et al. |
| 7,693,790 B2 | 4/2010 | Lawlor et al. |
| 7,702,583 B1 | 4/2010 | Hamilton et al. |
| 7,702,585 B2 | 4/2010 | Lyda et al. |
| 7,711,626 B2 | 5/2010 | Nanjundamoorthy et al. |
| 7,711,690 B1 | 5/2010 | Garrison et al. |
| 7,725,389 B1 | 5/2010 | D'Aquisto et al. |
| 7,729,283 B2 | 6/2010 | Ferguson et al. |
| 7,729,969 B1 | 6/2010 | Smith, III et al. |
| 7,729,996 B2 | 6/2010 | Zito |
| 7,734,541 B2 | 6/2010 | Kumar et al. |
| 7,752,130 B2 | 7/2010 | Byrd et al. |
| 7,752,535 B2 | 7/2010 | Satyavolu |
| 7,778,901 B2 | 8/2010 | Ganesan et al. |
| 7,788,172 B2 | 8/2010 | Kight et al. |
| 7,792,749 B2 | 9/2010 | Ganesan |
| 7,886,156 B2 | 2/2011 | Franchi |
| 7,979,348 B2 | 7/2011 | Thomas et al. |
| 8,032,932 B2 | 10/2011 | Speyer et al. |
| 8,073,772 B2 | 12/2011 | Bishop et al. |
| 8,327,429 B2 | 12/2012 | Speyer et al. |
| 8,369,601 B2 | 2/2013 | Lugg |
| 8,423,453 B1 | 4/2013 | Elliott |
| 8,688,580 B1 | 4/2014 | Guenther et al. |
| 8,725,607 B2 | 5/2014 | Dunn et al. |
| 8,725,609 B2 | 5/2014 | Pawelczyk et al. |
| 9,135,620 B2 | 9/2015 | Chen et al. |
| 9,195,984 B1 | 11/2015 | Spector et al. |
| 9,264,902 B1 | 2/2016 | Ward et al. |
| 9,600,817 B2 | 3/2017 | Bondesen et al. |
| 9,693,234 B2 | 6/2017 | Cook |
| 9,741,037 B2 | 8/2017 | Garlick et al. |
| 9,799,011 B2 | 10/2017 | Dunn et al. |
| 10,262,306 B2 | 4/2019 | Pawelczyk et al. |
| 10,387,879 B2 | 8/2019 | Thomas et al. |
| 11,436,577 B2 | 9/2022 | Davey et al. |
| 2001/0000537 A1 | 4/2001 | Inala et al. |
| 2001/0016034 A1 | 8/2001 | Singh et al. |
| 2001/0023414 A1 | 9/2001 | Kumar et al. |
| 2001/0024157 A1 | 9/2001 | Hansmann et al. |
| 2001/0032182 A1 | 10/2001 | Kumar et al. |
| 2001/0032183 A1 | 10/2001 | Landry |
| 2001/0051907 A1 | 12/2001 | Kumar et al. |
| 2002/0002536 A1 | 1/2002 | Braco |
| 2002/0007323 A1 | 1/2002 | Tamatsu |
| 2002/0010612 A1 | 1/2002 | Smith et al. |
| 2002/0010677 A1 | 1/2002 | Kitchen et al. |
| 2002/0015480 A1 | 2/2002 | Daswani et al. |
| 2002/0019808 A1 | 2/2002 | Sharma |
| 2002/0019809 A1 | 2/2002 | Kitchen et al. |
| 2002/0023108 A1 | 2/2002 | Daswani et al. |
| 2002/0046167 A1 | 4/2002 | Kitchen et al. |
| 2002/0046168 A1 | 4/2002 | Kitchen et al. |
| 2002/0049671 A1 | 4/2002 | Trende et al. |
| 2002/0049672 A1 | 4/2002 | Kitchen et al. |
| 2002/0052840 A1 | 5/2002 | Kitchen et al. |
| 2002/0059139 A1 | 5/2002 | Evans |
| 2002/0059369 A1 | 5/2002 | Kern et al. |
| 2002/0062282 A1 | 5/2002 | Kight et al. |
| 2002/0065773 A1 | 5/2002 | Kight et al. |
| 2002/0069161 A1 | 6/2002 | Eckert et al. |
| 2002/0077952 A1 | 6/2002 | Eckert et al. |
| 2002/0077961 A1 | 6/2002 | Eckert et al. |
| 2002/0077978 A1 | 6/2002 | O'Leary et al. |
| 2002/0087454 A1 | 7/2002 | Calo et al. |
| 2002/0087455 A1 | 7/2002 | Tsagarakis et al. |
| 2002/0087461 A1 | 7/2002 | Ganesan et al. |
| 2002/0087465 A1 | 7/2002 | Ganesan et al. |
| 2002/0091635 A1 | 7/2002 | Dilip et al. |
| 2002/0111886 A1 | 8/2002 | Chenevich et al. |
| 2002/0128964 A1 | 9/2002 | Baker et al. |
| 2002/0128968 A1 | 9/2002 | Kitchen et al. |
| 2002/0143655 A1 | 10/2002 | Elston et al. |
| 2002/0174048 A1 | 11/2002 | Dheer et al. |
| 2002/0184144 A1 | 12/2002 | Byrd et al. |
| 2002/0194137 A1 | 12/2002 | Park et al. |

(56) References Cited

U.S. PATENT DOCUMENTS

| | | |
|---|---|---|
| 2003/0014489 A1 | 1/2003 | Inala et al. |
| 2003/0018571 A1 | 1/2003 | Eckert et al. |
| 2003/0023552 A1 | 1/2003 | Kight et al. |
| 2003/0037002 A1 | 2/2003 | Higgins et al. |
| 2003/0089768 A1 | 5/2003 | Page |
| 2003/0120774 A1 | 6/2003 | Satyavolu et al. |
| 2003/0126075 A1 | 7/2003 | Mascavage, III et al. |
| 2003/0158811 A1 | 8/2003 | Sanders et al. |
| 2003/0182206 A1 | 9/2003 | Hendrix et al. |
| 2003/0187925 A1 | 10/2003 | Inala et al. |
| 2003/0191701 A1 | 10/2003 | Haseltine et al. |
| 2003/0191711 A1 | 10/2003 | Jamison et al. |
| 2003/0191832 A1 | 10/2003 | Satyavolu et al. |
| 2003/0195844 A1 | 10/2003 | Hogan |
| 2003/0208421 A1 | 11/2003 | Vicknair et al. |
| 2003/0208441 A1 | 11/2003 | Poplawski et al. |
| 2003/0225705 A1 | 12/2003 | Park et al. |
| 2003/0236728 A1 | 12/2003 | Sunderji et al. |
| 2004/0034594 A1 | 2/2004 | Thomas et al. |
| 2004/0039701 A1 | 2/2004 | Nakamura et al. |
| 2004/0059671 A1 | 3/2004 | Nozaki et al. |
| 2004/0059672 A1 | 3/2004 | Baig et al. |
| 2004/0059673 A1 | 3/2004 | Kitchen et al. |
| 2004/0064407 A1 | 4/2004 | Kight et al. |
| 2004/0064408 A1 | 4/2004 | Kight et al. |
| 2004/0064409 A1 | 4/2004 | Kight et al. |
| 2004/0064410 A1 | 4/2004 | Kight et al. |
| 2004/0071333 A1 | 4/2004 | Douglas et al. |
| 2004/0078423 A1 | 4/2004 | Satyavolu et al. |
| 2004/0078464 A1 | 4/2004 | Rajan et al. |
| 2004/0083167 A1 | 4/2004 | Kight et al. |
| 2004/0083171 A1 | 4/2004 | Kight et al. |
| 2004/0088235 A1 | 5/2004 | Ziekle et al. |
| 2004/0093305 A1 | 5/2004 | Kight et al. |
| 2004/0133515 A1 | 7/2004 | McCoy et al. |
| 2004/0139005 A1 | 7/2004 | Ganesan |
| 2004/0139009 A1 | 7/2004 | Kozee et al. |
| 2004/0139010 A1 | 7/2004 | McMichael et al. |
| 2004/0139011 A1 | 7/2004 | Kozee et al. |
| 2004/0143552 A1 | 7/2004 | Weichert et al. |
| 2004/0148235 A1 | 7/2004 | Craig et al. |
| 2004/0148252 A1 | 7/2004 | Fleishman |
| 2004/0215543 A1 | 10/2004 | Betz et al. |
| 2004/0225609 A1 | 11/2004 | Greene |
| 2004/0236653 A1 | 11/2004 | Sokolic et al. |
| 2004/0236681 A1 | 11/2004 | Modigliani et al. |
| 2005/0010483 A1 | 1/2005 | Ling |
| 2005/0010523 A1 | 1/2005 | Myklebust et al. |
| 2005/0086136 A1 | 4/2005 | Love et al. |
| 2005/0086165 A1 | 4/2005 | Pawelczyk et al. |
| 2005/0119971 A1 | 6/2005 | Zito |
| 2005/0137960 A1 | 6/2005 | Brann et al. |
| 2005/0137978 A1 | 6/2005 | Ganesan et al. |
| 2005/0149439 A1 | 7/2005 | Suisa |
| 2005/0154923 A1 | 7/2005 | Lok et al. |
| 2005/0171899 A1 | 8/2005 | Dunn et al. |
| 2005/0171900 A1 | 8/2005 | Onneken |
| 2005/0177505 A1 | 8/2005 | Keeling et al. |
| 2005/0182720 A1 | 8/2005 | Willard et al. |
| 2005/0187867 A1 | 8/2005 | Sokolic et al. |
| 2005/0192901 A1 | 9/2005 | McCoy et al. |
| 2005/0198377 A1 | 9/2005 | Ferguson et al. |
| 2005/0203835 A1 | 9/2005 | Nhaissi et al. |
| 2005/0203844 A1 | 9/2005 | Ferguson et al. |
| 2005/0210297 A1 | 9/2005 | Wu et al. |
| 2005/0222954 A1 | 10/2005 | Keown et al. |
| 2006/0047724 A1 | 3/2006 | Messing et al. |
| 2006/0106717 A1 | 5/2006 | Randle et al. |
| 2006/0136595 A1 | 6/2006 | Satyavolu |
| 2006/0184451 A1 | 8/2006 | Ganesan et al. |
| 2006/0195398 A1 | 8/2006 | Dheer et al. |
| 2006/0206425 A1* | 9/2006 | Sharma ............... G06Q 20/027 |
| 2006/0230343 A1 | 10/2006 | Armandpour et al. |
| 2006/0253340 A1 | 11/2006 | Levchin et al. |
| 2006/0253463 A1 | 11/2006 | Wu et al. |
| 2006/0282381 A1 | 12/2006 | Ritchie |
| 2007/0011090 A1 | 1/2007 | Baker et al. |
| 2007/0067239 A1 | 3/2007 | Dheer et al. |
| 2007/0088821 A1 | 4/2007 | Sankuratripati et al. |
| 2007/0094151 A1 | 4/2007 | Moenickheim et al. |
| 2007/0100748 A1 | 5/2007 | Dheer et al. |
| 2007/0106612 A1 | 5/2007 | O'Brien et al. |
| 2007/0121840 A1 | 5/2007 | Ganesan et al. |
| 2007/0125840 A1 | 6/2007 | Law et al. |
| 2007/0130347 A1 | 6/2007 | Rangan et al. |
| 2007/0131758 A1 | 6/2007 | Mejias et al. |
| 2007/0156584 A1* | 7/2007 | Barnes ............... G06Q 20/027 |
| 2007/0162769 A1 | 7/2007 | Sokolic et al. |
| 2007/0179885 A1 | 8/2007 | Bird et al. |
| 2007/0180380 A1 | 8/2007 | Khavari et al. |
| 2007/0208645 A1 | 9/2007 | Hoffman et al. |
| 2007/0230371 A1 | 10/2007 | Tumminaro |
| 2007/0233615 A1 | 10/2007 | Tumminaro |
| 2007/0239601 A1 | 10/2007 | Ganesan et al. |
| 2007/0244811 A1 | 10/2007 | Tumminaro |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro et al. |
| 2007/0255662 A1 | 11/2007 | Tumminaro |
| 2008/0015982 A1 | 1/2008 | Sokolic et al. |
| 2008/0032741 A1 | 2/2008 | Tumminaro |
| 2008/0033878 A1 | 2/2008 | Krikorian et al. |
| 2008/0052226 A1 | 2/2008 | Agarwal et al. |
| 2008/0082454 A1 | 4/2008 | Dilip et al. |
| 2008/0086403 A1 | 4/2008 | Dilip et al. |
| 2008/0086426 A1 | 4/2008 | Dilip et al. |
| 2008/0091663 A1 | 4/2008 | Inala et al. |
| 2008/0097899 A1 | 4/2008 | Jackson et al. |
| 2008/0133407 A1 | 6/2008 | Guillory et al. |
| 2008/0263069 A1 | 10/2008 | Harris et al. |
| 2008/0275816 A1 | 11/2008 | Hazlehurst |
| 2008/0288376 A1 | 11/2008 | Panthaki et al. |
| 2008/0288400 A1 | 11/2008 | Panthaki et al. |
| 2008/0301022 A1 | 12/2008 | Patel et al. |
| 2008/0301023 A1 | 12/2008 | Patel et al. |
| 2008/0306846 A1 | 12/2008 | Ferguson |
| 2008/0319880 A1 | 12/2008 | D'Aquisto et al. |
| 2009/0006205 A1 | 1/2009 | Bixler et al. |
| 2009/0006582 A1 | 1/2009 | Daswani et al. |
| 2009/0024505 A1 | 1/2009 | Patel et al. |
| 2009/0063197 A1 | 3/2009 | Lisle |
| 2009/0076950 A1 | 3/2009 | Chang et al. |
| 2009/0119190 A1 | 5/2009 | Realini |
| 2009/0125446 A1 | 5/2009 | Saunders et al. |
| 2009/0132289 A1 | 5/2009 | Stenman et al. |
| 2009/0138394 A1 | 5/2009 | Garrison et al. |
| 2009/0222369 A1 | 9/2009 | Zoldi et al. |
| 2009/0265241 A1 | 10/2009 | Bishop et al. |
| 2009/0265774 A1 | 10/2009 | Malik et al. |
| 2009/0271854 A1 | 10/2009 | Hazlehurst et al. |
| 2009/0287601 A1 | 11/2009 | Tumminaro et al. |
| 2009/0287613 A1 | 11/2009 | Pierdinock et al. |
| 2009/0319410 A1 | 12/2009 | Kight et al. |
| 2009/0319425 A1 | 12/2009 | Tumminaro et al. |
| 2010/0004990 A1 | 1/2010 | Hazlehurst et al. |
| 2010/0005025 A1 | 1/2010 | Kumar et al. |
| 2010/0017332 A1 | 1/2010 | Kight et al. |
| 2010/0030687 A1 | 2/2010 | Panthaki et al. |
| 2010/0100462 A1 | 4/2010 | Lyda et al. |
| 2010/0100466 A1 | 4/2010 | Garrison et al. |
| 2010/0100467 A1 | 4/2010 | McCoy et al. |
| 2010/0138243 A1 | 6/2010 | Carroll |
| 2010/0198645 A1 | 8/2010 | Heiss et al. |
| 2011/0125613 A1 | 5/2011 | Franchi |
| 2011/0202415 A1 | 8/2011 | Casares et al. |
| 2011/0295746 A1 | 12/2011 | Thomas et al. |
| 2012/0284175 A1 | 11/2012 | Wilson et al. |
| 2013/0144783 A1* | 6/2013 | Bishop ............... G06Q 20/223 |
| 2013/0262296 A1 | 10/2013 | Thomas et al. |
| 2013/0268839 A1 | 10/2013 | Lefebvre et al. |
| 2013/0293363 A1 | 11/2013 | Plymouth et al. |
| 2013/0297501 A1 | 11/2013 | Monk et al. |
| 2014/0067677 A1 | 3/2014 | Ali et al. |
| 2014/0089182 A1 | 3/2014 | Short et al. |

(56) References Cited

U.S. PATENT DOCUMENTS

| | | | |
|---|---|---|---|
| 2014/0164246 | A1 | 6/2014 | Thomas et al. |
| 2014/0188728 | A1 | 7/2014 | Dheer et al. |
| 2014/0289106 | A1 | 9/2014 | Pawelczyk et al. |
| 2015/0046319 | A1 | 2/2015 | Thomas et al. |
| 2015/0161597 | A1 | 6/2015 | Subramanian et al. |
| 2015/0254665 | A1 | 9/2015 | Bondesen et al. |
| 2015/0324801 | A1 | 11/2015 | Thomas et al. |
| 2016/0019536 | A1 | 1/2016 | Ortiz et al. |
| 2016/0092872 | A1 | 3/2016 | Prakash et al. |
| 2016/0358163 | A1 | 12/2016 | Kumar et al. |
| 2016/0359829 | A1 | 12/2016 | Gulledge |
| 2017/0004501 | A1 | 1/2017 | Ledford et al. |
| 2017/0221066 | A1 | 8/2017 | Ledford et al. |
| 2017/0344960 | A1 | 11/2017 | Garlick et al. |
| 2017/0344964 | A1 | 11/2017 | Garlick et al. |
| 2017/0353420 | A1 | 12/2017 | Garlick et al. |
| 2017/0372319 | A1 | 12/2017 | Garlick et al. |
| 2018/0012199 | A1 | 1/2018 | Dunn et al. |
| 2018/0012200 | A1 | 1/2018 | Dunn et al. |
| 2018/0012201 | A1 | 1/2018 | Dunn et al. |
| 2018/0174140 | A1 | 1/2018 | Garlick et al. |
| 2018/0308070 | A1* | 10/2018 | Raina .................. G06Q 20/027 |
| 2019/0043052 | A1 | 2/2019 | Ledford et al. |
| 2019/0220833 | A1 | 7/2019 | Pawelczyk et al. |
| 2019/0163790 | A1* | 9/2019 | Jennings ............... G06F 17/305 |

FOREIGN PATENT DOCUMENTS

| | | |
|---|---|---|
| EP | 0 593 209 A2 | 4/1994 |
| EP | 0 661 654 A2 | 7/1995 |
| GB | 2 328 310 A | 2/1999 |
| GB | 2533379 A | 6/2016 |
| GB | 2533380 A | 6/2016 |
| GB | 2533432 A | 6/2016 |
| GB | 2533562 A | 6/2016 |
| GB | 2537087 A | 10/2016 |
| WO | 90/04837 A1 | 5/1990 |
| WO | 91/06058 A1 | 5/1991 |
| WO | 93/02424 A1 | 2/1993 |
| WO | 95/12859 A1 | 5/1995 |
| WO | 97/07468 A1 | 2/1997 |
| WO | 97/22060 A1 | 6/1997 |
| WO | 98/18095 A1 | 4/1998 |
| WO | 98/47100 A1 | 10/1998 |
| WO | 98/58356 A2 | 12/1998 |
| WO | 99/56219 A1 | 11/1999 |
| WO | 02/17196 A1 | 2/2002 |
| WO | 03/060749 A1 | 7/2003 |
| WO | 2007/053123 A2 | 5/2007 |
| WO | 2007/056274 A2 | 5/2007 |
| WO | 2008/027620 A1 | 3/2008 |
| WO | 2008/027621 A1 | 3/2008 |
| WO | 2008/060725 A2 | 5/2008 |
| WO | 2009/114876 A2 | 9/2009 |
| WO | 2009/152184 A1 | 12/2009 |
| WO | 2016/097672 A1 | 6/2016 |
| WO | 2016/097673 A1 | 6/2016 |
| WO | 2016/097674 A1 | 6/2016 |
| WO | 2016/097675 A1 | 6/2016 |

OTHER PUBLICATIONS

250 U.S. Banks to Use NCR, Cincinnati Bell Financial Systems, AT&T News Release, http://www.att.com/news/0593/930504.ncd.html, 2 pages (May 4, 1993).
"3174 Configuration," http://www.commercecomputer.com/3174.html, Commerce Computer Corporation, 3 pages (Downloaded Oct. 7, 2002).
3174 Network Processor, Specification Sheet, http://ecc400.com/IBM/controllers/314.prod.htm, Downloaded Oct. 7, 2002.
7780 Mid-Range Item Processing—Product Overview, NCR Corporation, http://www.ncr.com/products/hardware/hw_7780_ts_product.htm, 4 pages (Downloaded Nov. 15, 2002).
7780 Mid-Range Item Processing—Technical Specifications, NCR Corporation, http://www.ncr.com/products/hardware/hw_7780_ts_product.htm, 1 page (Downloaded Nov. 15, 2002).
7780—The Robust, Reliable Solution . . . for Processing Varying Volumes in any Environment, NCR Corporation, 8 pages (1998).
"820 Payment Order/Remittance Advice" Version: X12-4010, pp. 1-61, Sep. 2005.
"835 Health Care Claim Payment/Advice" Version: 1.0 Final, pp. 1-70, Jul. 20, 2011.
"A Primer on HIPAA and the ACH Network," Banking Industry HIPAA Task Force, pp. 1-34.
About FSTC, Financial Services Technology Consortium, http://www.fstc.org/about/history.cfm, 2 pages (Downloaded Feb. 27, 2003).
"ACI Proactive Risk Manager™M for Enterprise Risk—Product Flyer," ACI Universal Payments, www.aciworldwide.com, 4 pages, 2016.
Addink et al., "AS/400 ImagePlus System View," IBM Systems Journal, vol. 29, No. 3, pp. 451-466 (1990).
"American National Standard for Financial Image Interchange: Architecture, Overview and System Design Specification," American Bankers Association, American National Standards Institute, Inc., pp. 1-202 (1994).
Anderson, Re: Electronic Check and Check Law, Letter to Robert Ballen, 2 pages (Apr. 8, 1996).
Anderson et al., "ImagePlus Workstation Program," IBM Systems Journal, vol. 29, No. 3, pp. 398-407 (1990).
"ANSI/ABA X9.46-1995, Draft version 0.13, American National Standard For Financial Image Interchange: Architecture, Overview and System Design Specification," American Bankers Association, American National Standards Institute, Inc., 229 pages (1995).
"ANSI/ABA X9.46-1997, American National Standard For Financial Image Interchange: Architecture, Overview and System Design Specification," American Banker Association, American National Standards Institute, Inc., 245 pages (Jan. 21, 1997).
Arnold B. et al., "Increasing eBilling in the Healthcare Industry Without Running Afoul of Privacy Laws," 2011 Payments, pp. 1-29, Apr. 3-6, 2011.
AT&T Global Offers One-Step Imaging. (AT&T Global Information Solutions) (Brief Article), American Banker, vol. 159, No. 39, p. 14A(1), 1 page (Feb. 28, 1994).
AT&T Partners with Fiserv to Form Single Source Provider for Leading Image Item Processing Solutions, PR Newswire, p. 913C1011, 2 pages (Sep. 13, 1995).
Atzel, Article Order, Email to Marshall J. Hambro, 1 page (Oct. 9, 2001).
"Authentication in an Internet Banking Environment," Federal Financial Institutions Examination Council, http://www.ffiec.gov/pdf/authentication_guidance.pdf, pp. 1-14, published 2005.
Avers et al., "ImagePlus as a Model for Application Solution Development," IBM Systems Journal, vol. 29, No. 3, pp. 356-370 {1990}.
Baby Boomers, Generation X are Both Addicted to the ATM, AT&T News Release, http://www.att.com/news/0295/950228.nca.html, 3 pages (Feb. 28, 1995).
Banctec Inc. has Received Another Order for its Image Statement Processing Product. (First National Bank of Chicago Orders ImageFirst), Financial Services Report, vol. 8, No. 22, p. 5(2) (Nov. 13, 1991).
Banet, Document Image Processing, 1991: The Imaging Edge, Seybold Report on Publishing Systems, vol. 20, No. 19, p. 22(8), 10 pages (Jun. 24, 1991).
Bank Automation News, Phillips Business Information, vol. 9, Issue 6, 2 pages (Apr. 2, 1997).
Banks to Check Out Imaging (Solutions), Communicationsweek International, No. 093, p. 46, 2 pages (Oct. 19, 1992).
Barhel, "NCR and Unisys Exchange Check Images in a Pivotal Test. (Computer Makers Test Compatibility of Check Imaging Systems)," American Banker, vol. 158, No. 67, p. 3(1), 2 pages (Apr. 8, 1993).
Barthel, "Unisys, Banctec Offer PC-based Imaging: High-tech Check Statements Produced; Community Banks are Market, (Banctec Systems Inc.)," American Banker, vol. 157, No. 195, p. 3(1) (Oct. 8, 1992).

(56) References Cited

OTHER PUBLICATIONS

Bartholomew, "More Checks on Checks—Bank of America Plans to Convert to an IBM Imaging System that Screens Checks Faster and More Thoroughly (Spotlight)," Informationweek, No. 504, p. 32 (Dec. 5, 1994).
Bartimo et al., "Fine Tuning the Terminal Picture," ComputerWorld, Special Report, vol. XVII, No. 35, 48 pages (Aug. 29, 1983).
Beckett, P., "Credit-card Firms Get Into Web Game," Asian Wall Street Journal, p. N1, 1 page (Apr. 3, 2001).
Behnke, "NSSDC's Mass Storage System Evolves," NSSDC, http://nssdc.gsfc.gov/nssdc_news/Mar. 95/09_j_behnke_0395.html, 2 pages (Mar. 1995).
Bill Processing: US West Re-engineers with $7.2 Million Unisys Image-based Remittance Processing Solution, EDGE, On & About AT&T, vol. 10, No. 378, 3 pages (Oct. 23, 1995).
Blankenhorn, "Cincinnati Bell and Unisys Go Into Bank Imaging. (Cincinnati Bell Information Systems, Inc.)", Newsbytes, p. NEW10240020, 1 page (Oct. 24, 1990).
Block, USAA Federal Gets Imaging System. (USAA Federal Savings Bank, Cincinatti Bell Information Systems Inc.) (Brief Article), American Banker, vol. 159, No. 49, p. 6A(1), page (Mar. 14, 1994).
Booker, "Bank to Test Scalable NCR Imaging for Check Processing," Computerworld, p. 66, 2 pages (Dec. 14, 1992).
Broadway & Seymour Announces Client/Server Product for Item and Image Processing, Business Wire, p. 03201186, 2 pages (Mar. 20, 1995).
Broadway & Seymore Announces New VISUALIMPACT Release, Business Wire, p. 3291274, 2 pages (Mar. 29, 1996).
Broadway & Seymour to Invest in Two Strategic Initiatives, Business Wire, p. 03151248, 2 pages (Mar. 15, 1995).
Brooks, A., "Still Waiting for the E-Mail and Faxes to Start Coming In?", The New York Times, (East Coast Late Edition), New York, NY, Dec. 19, 1996, p. C7, 2 pages.
Brown, "Imaging May Dramatically Alter Bank Data Networks," Network World, vol. 6, No. 19, p. 6(2), 1 page (May 15, 1989).
Brown, R.J., ANSI X9.46, Data Structure Reference, IBM Corporations, 16 pages (Jul. 31, 1995).
Brown, R.J., "FSTC Image Interchange Project: Pilot Phase-1A Preliminary Architecture and Project Plan," 34 pages (Jun. 30, 1995).
Buchok, "OCR Gets Processing Credit," Computing Canada, vol. 19, No. 26, p. 30(1), 1 page (Dec. 20, 1993).
"By-law No. 7 Respecting the Large Value Transfer System," Canada Gazette, Part I, vol. 132, No. 16 (Canadian Government Publishing, online: Archive 1998, Part I, http://canadagazette.gc.ca/part1/1998/19980418/pdf/gl-13216.pdf, Apr. 18, 1998, 71 pages.
Cahill, T.P., "Image Processing Applications at the Chase Manhattan Bank," 2 pages (date unknown).
Cantwell, Data Compression Over Frame Relay Implementation Agreement FRF.9, Frame Relay Forum Technical Committee, 38 pages (Jan. 22, 1996).
"CAQH Committee on Operating Rules for Information Exchange (CORE), Phase III Core EFT & ERA Operating Rule Set," pp. 1-138, Jun. 2012.
Carey, T.W., "Quicken versus Money," PC World, vol. 14, No. 4, p. 162(6), 8 pages (Apr. 1996).
Casey et al., "Intelligent Forms Processing," IBM Systems Journal, vol. 29, No. 3, pp. 435-450 (1990).
CashFlex Selects NCR Item Processing Systems for Lockbox, AT&T News Release, http://www.att.com/news/0793/930712.ncd.html, 2 pages (Jul. 12, 1993).
Chase's New Image (Chase Manhattan Awards 12-yrs Image-processing Contract to Flserv; Contract Could Generate $40 mil/yr in Revenue for Flserv), Information Week, No. 517, p. 14, 1 page (Mar. 6, 1995).
"Check Adjustment Quick Reference Guide," Federal Reserve System, 10 pages (Jul. 1996).
Check Adjustment Request Federal Reserve Bank, Form FRBADJ, 1 page (Sep. 1993).

"Check Clearing for the 21st Century Act: Frequently Asked Questions about Check 21," http://www.federalreserve.gov/paymentsystems/truncation/faqs.htm, The Federal Reserve Board, 2 pages (Jan. 27, 2005).
Check Image Exchange Project—Project Participants, FSTC Projects, FSTC, http://www.fstc.org/projects/imaging/participants.cfm, 1 page (Downloaded Oct. 30, 2002).
Check-Image Interchange Inches Closer (New York Clearing House, Chase Manhattan Bank and Federal Reserve Bank of Boston All Launch Check-image Interchange Program), Bank Technology News, vol. 10, No. 1, p. 19+, 2 pages (Jan. 1997).
"Check Image Processing Archive and Retrieval System Proposal: Technical Volume—Total System Solution Overview," BancTec, Incorporated, 128 pages (Jul. 8, 1994).
Check Image Processing Delivers Truncation Benefits Today, NCR Reports—Financial Services Trends & Technologies, NCR Corporation, vol. 1, 1ss. 8, 13 pages (1997).
Check Technology Case Stays in Texas, IP Law Bulletin, 4 pages (Oct. 13, 2005).
Checks & Checking: Check Imaging at the Teller Station, Bank Technology News, vol. 9, No. 10, p. 37 (Oct. 1996).
Chemical Chooses IBM Check Imaging (Chemical Banking Corp to Install IBM's ImagePlus High Performance Transaction System to Process 9 Mil Checks Daily), Bank Technology News, vol. 8, No. 9, p. 11 (Sep. 1995).
Cincinnati Bell: CBIS & Unisys in Major Imaging Agreement, EDGE, On & About AT&T, vol. 5, No. 118, 1 page (Oct. 29, 1990).
Cincinnati Bell Information Systems (Integrator Briefs), Computer Reseller News, No. 534, p. 129 (Jul. 12, 1993).
Cisco Partners with AT&T CMS on Network Switch Manufacturing, Lucent Technologies, http://www.lucent.com/press/0995/950926.mma.html, 2 pages (Sep. 26, 1995).
Citibank, New Castle Installation, one page (no date available).
Cooney,"*Frame* * Relay* Comes to Computerm Extenders," Network World, p. 14, 2 pages (Jun. 28, 1993).
Company Background and Product Guide, MagTek, 42 pages (no date available).
Computerm Announces Remote Check Imaging Support for VMC 8200 High-speed Channel Extension System, PR Newswire, p. 408LAM012, 2 pages (Apr. 8, 1996).
Computerm Earns MCI "Level 1" Approval; Computerm's Industry Exclusive Native *Frame * *Relay* Interface Passes Test for Interoperability with MCI's *Frame* * Relay* Services, Business Wire, p. 4121139, 2 pages (Apr. 12, 1995).
Computerm Eases Remote Imaging, (Introduces Remote Image Solution) Brief Article, American Banker, vol. 158, No. 156, p. 13A(1), 1 page (Aug. 16, 1993).
Computerm Enables Boatmen's Bancshares to Execute Remote Check Imaging, PR Newswire, p. 408LAM013 (Apr. 8, 1996).
Cortese, Image Yields Interest at Banks, Collaboration Results in Imaging System to Automate Check Processing, Computerworld, p. 6, 2 pages (Mar. 19, 1990).
Costanzo, "As Banks Cling to the Conventional, Check-imaging Struts its Stuff," Bank Technology News, p. 1, 5 pages (Mar. 1994).
Crockett, Systematics to Use Deposited-check Imaging; Installation at Firm's N.J. Center Would be the First by an Outsourcer, Systematics Financial Services Inc., Unisys Corp., American Banker, vol. 158, No. 95, p. 3(1), 2 pages (May 19, 1993).
Crone, Reducing Data Processing Costs with a Remote Item Processing System, Bank Administration, vol. 62, No. 10, pp. 44-46 (Oct. 1986).
Cummings, S., "Home Banking with Quicken," New York: MIS Press, 15 pages (1996).
Current Check Flow, PowerPoint Presentation, Check[1].ppt, pp. 1-4.
"Declaration of Richard Jesmajian," In re Claudio R. Ballard for Remote Image Capture with Centralized Processing and Storage, 3 pages (Nov. 18, 2005).
Department of Health and Human Services, Federal Register, vol. 77, No. 6, pp. 1556-1590, Jan. 10, 2012.
Depompa, "IBM Adds Image-based Processing," MIS Week, vol. 11, No. 12, p. 12(1), 2 pages (Mar. 19, 1990).

(56) References Cited

OTHER PUBLICATIONS

Dinan et al., "ImagePlus High Performance Transaction System," IBM Systems Journal, vol. 29, No. 3, pp. 421-434 (1990).
Dowdell, "Security," Email to fstc-imagE, 2 pages (Apr. 27, 1996).
ECheck: Homepage, http://www.echeck.org, Downloaded Feb. 27, 2003, 1 page.
"Electronic Check Adjustments: Are You Using FedLine?", The Federal Reserve Bank of St. Louis, http://www.stlouisfed.com/publications/pq/1998/a/pq1998a5.html, 3 pages (Spring 1998).
"Electronic Imaging '88—International Electronic Imaging Exposition & Conference," (Advance Printing of Paper Summaries), Anaheim, California, Mar. 28-31, 1988, 26 pages.
Electronic Payment Systems Support/Check Processing Control System: Program Reference and Operations Manual, IBM Corporation, 6 pages (Jun. 1986).
Encryption and Digital Signature Explained, Northern Telecom Inc., 4 pages (no date available).
European Search Report for Application No. 037285327 dated Feb. 15, 2008, 3 pages.
Evans, "The End of Paper Wait: Document Imaging. (includes related articles on successful document imaging implementations at Borgess Medical Center, the Huntington Internal Medicine Group, the University of Alabama Health Services Foundation and Quest Diagnostics)(Industry Trend or Event)," Health Management Technology, vol. 18, No. 2, p. 16(5), 7 pages (Feb. 1997).
Fassett, "Impact of Imaging," Bank Management, vol. 67, No. 11, p. 56, 1 page (Nov. 1991).
"Financial EDI over the Internet, A pilot conducted by BankAmerica and Lawrence Livermore National Laboratory," Bank of America, 1996. http://www.bofa.com/batoday/edi_briefing.html, 7 pages (Copyright 1996).
"Financial Services Technology Consortium—Interbank Check Imaging Project—White Paper (Draft)," FSTC, pp. 1-29 (Jun. 20, 1994).
Fisher, "IBM, Customers Continue Work on Document Image Processor," Datamation, vol. 34, No. 19, 3 pages (Oct. 1, 1988).
Fitch, "Check Image Capture Speeds Up Positive Pay Reconcilement," Corporate Cashflow, pp. 7 & 11 (Feb. 1995).
Fitch, "Digital Image Systems Speed Return Items, Exceptions," Corporate Cashflow, pp. 8 & 10 (May 1996).
Frequently Asked Questions on Drive Space Issues, Drive Space FAQ, 1 page (date unknown).
Fricke, "PACES Paperless Automated Check Exchange & Settlement Next Steps," Chase Manhattan Bank, 10 pages (Aug. 12, 1997).
Frost National Bank Selects NCR Over Old Mainframe Environment, AT&T News Release, http://www.aft.com/news/0493/930428.nca.html, 2 pages (Apr. 28, 1993).
"FSTC Check Image Interchange Project—Archive Storage and Retrieval Component Decomposition," 20 pages (May 25, 1995).
FSTC Demonstrates Interbank Check Image Pilot; Multi-Vendor System Speeds Check Clearing, Cuts Fraud, FSTC Projects—Check Image Exchange Project, Press Release, http://www.fstc.orq/projects/imaging/public/information.cfm, 2 pages (Dec. 12, 1995).
FSTC Financial Services Technology Consortium, PowerPoint Presentation, Ansi6v4[1].ppt, pp. 1-27 (no date available).
FSTC Interbank Check Imaging Unisys Monthly Status Report, pp. 1-7 (Jun. 26, 1996).
FSTC Interbank Check Imaging Unisys Monthly Status Report, pp. 1-9 (Jul. 22, 1996).
FSTC Projects, Check Image Exchange Project (a.k.a Interbank Check Imaging Project), Financial Services Technology Consortium, http://www.fstc.org/projects/imaging/index.cfm, 6 pages (Downloaded Oct. 30, 2002).
Garvey, "Check Processing Goes Digital—Chase Manhattan Bank to Store Checks Electronically, Saving Time and Money," Informationweek, No. 648, p. 20, 1 page (Sep. 15, 1997).
Gawen, "PC Based Document Image Processing and Signature Verification," OIS IMC91 Document Imaging, Proceedings of the Information & Image Management Conference, London, pp. 389-391 (Jul. 1991).

Global Concepts—Payment Systems Consulting, Global Concepts, Inc., http://www.global-concepts.com/image_archive.htm, 1 page (Downloaded Nov. 20, 2002).
Graf, R.F., "Modern Dictionary of Electronics," 6th Edition, 5 pages (1997).
"Guardian Analytics FraudDESK," Guardian Analytics, www.guardiananalytics.com, 2 pages, 2016.
Gullo, "NCR, Unisys Plan Check Imaging for IBM Systems," American Banker, vol. 156, No. 249, p. 1(2), 2 pages (Dec. 30, 1991).
Gwendolyn Lohse et al., "Federal Operating Rules for Healthcare Administrative Simplification," 2011 Payments, NACHA—The Electronic Payments Association, pp. 1-32, Apr. 3-6, 2011.
Hakeda, "The Image Object Content Architecture," IBM Systems Journal, vol. 29, No. 3, pp. 333-342 (1990).
Hanna, FSTC Image Exchange, POS Image Capture Pilot—Reader-Scanner Study, RDM Corp, 1 page (May 21, 1996).
Harding et al., "Object Storage Hierarchy Management," IBM Systems Journal, vol. 29, No. 3, pp. 384-397 (1990).
"Healthcare in the Electronic Environment, Payment, Information and Communication Within the Revenue Cycle," Alacriti Clearwave, 2011 Payments, pp. 1-30, Apr. 3-6, 2011.
Helm, "Banks Check Into Image Processing," Computers in Banking, vol. 7, No. 3, p. 25(7), 8 pages (Mar. 1990).
Helm, "Who's Doing What in Image Processing. (includes definition of image processing)," ABA Banking Journal, vol. 83, No. 1, p. 31(3), 6 pages (Jan. 1991).
Helms, "Introduction to Image Technology," IBM Systems Journal, vol. 29, No. 3, pp. 313-332 (1990).
Henry Ijams et al., "Evaluating ePayables Opportunities to Improve A/P Efficiencies," pp. 1-28, Jun. 22, 2011.
High-Volume Data Capture Sans the Paper, Bank Systems & Technology, p. 35 (May 1996).
Horine, "AT&T and Fiserv Team to Offer Imaging Solutions," AT&T News Release, http://www.att.com/news/0995/950913.nca.html, 2 pages (Sep. 13, 1995).
Huntington Bancshares in the Forefront of Technology with Purchase of Unisys Check Imaging System, PR Newswire, p. 1 (Oct. 11, 1989).
IBM 3898 Image Processor, Product Announcement, IBM, 3 pages (Mar. 19, 1990).
"IBM 3995 Optical Library Dataserver—Economical, high-capacity, removable optical storage," IBM Corporation, 4 pages (1991).
"IBM Proposal for FRB Phase Four: Image Archive System," IBM Financial Document Processing, IBM, 175 pages (Nov. 7, 1991).
"IBM ImagePlus Fact Sheet," IBM Corporation, 2 pages (1991).
"IBM's ImagePlus eases transformation of the Worker's Compensation Board," IBM Corporation, 2 pages (1991).
"IBM's ImagePlus key to improving Royal Trust's customer service," IBM Corporation, 2 pages (1991).
"IBM's ImagePlus: Making USAA's 'Impossible Dream' a reality," IBM Corporation, 3 pages (1991).
IBM X9.46 Pilot Status—Summary, 3 pages (no date available).
"Ibnamed, A Load Balancing Name Server Written in Perl," http://www.standford.edu/-schemers/docs/lbnamed/lbnamed.html, 5 pages (Sep. 17, 1995).
"ICI Project Security Work Session, Agenda," 3 pages (May 10, 1996).
IdeaCopTM OpenOpposition Prior Art Report for U.S. Pat. No. 5,910,988 by PatenTrakkerTM, Email regarding USPTO Reexam. C.N. 90/007,829, Requested Date: Nov. 25, 2005, from "PT" <admin@patentrakker.com>, pp. 1-13 (May 10, 2006).
"Image Archive Forum—Payments Systems Task Force—Economic Framework," 33 pages (Jan. 27, 1998).
"Image Archive Forum—Payments System Task Force—Introduction," 52 pages (1998).
Image Can Be . . . Everything!, At Your Service, A Newsletter from the Federal Reserve Bank of Kansas City, pp. 1-6 (Special Edition—Summer 1995).
Image Processing Survival Guide, vol. II—Sure-Fire Strategies for Implementing Image-Remittance, Phillips Business Information, Inc., 40 pages (1996).

(56) References Cited

OTHER PUBLICATIONS

"Image systems garner NOAC spotlight (American Bankers' Association's National Operations and Automation Conference)," Computer in Banking, vol. 6, No. 7, p. 8(4), 9 pages (Jul. 1989).
"Image Quality Functional Requirements," FSTC, Chase Manhattan Bank, 19 pages (Jul. 26, 1995).
Imaging Products, United States Banker, vol. 100, No. 8, p. 23(3), 6 pages (Aug. 1990).
Imaging Technology: Generating New Bank Revenues in the Age of the Consumer, NCR Reports—Financial Services Trends & Technologies, NCR Corporation, Issue 1, 4 pages (Jan. 1997).
Imaging Vendors Shape Processing, Banking Management, vol. 69, No. 4, p. 29, 1 page (Apr. 1993).
Implementing Imaging Payment Systems: Managing Change to Achieve Results, NCR Reports—Financial Services Trends & Technologies, NCR Corporation, Issue 2, 3 pages (Feb. 1997).
Implementing National Electronic Payment System in Emerging Economies, NCR Reports—Financial Services Trends & Technologies, NCR Corporation, vol. 1, Issue 7, 12 pages (1997).
"Industry Security Leader Racal Supports Visa/Mastercard Proposal for Internet," PR Newswire, 2 pages (Apr. 17, 1996).
Information Technology Outsourcing: Sharpening Management Focus in Financial Institutions, NCR Reports—Financial Services Trends & Technologies, NCR Corporation, Issue 5, 6 pages (1997).
Integrated, Customer-Focused Banking Architecture: Tomorrow's Competitive Edge, NCR Reports—Financial Services Trends & Technologies, NCR Corporation, Issue 3, 6 pages (Mar. 1997).
Interbank Check Image Project, FSTC, PowerPoint Presentation, No. 1016V4[1].ppt, 18 pages (no date available).
Interbank Check Imaging, FSTC General Meeting—Orlando, Florida, 5 pages (Apr. 17, 1997).
International Search Report for Application No. PCT/US00/33010 dated Jun. 21, 2002, 4 pages.
Introducing the Age of Document-Image Processing, FileNet™ Brochure, FileNet Corporation, 13 pages (1984).
Irfan Ahmad, "Payments Processor Perspective on EFT Enrollment," Hearing 2—Section 10109 of the Affordable Care Act Provider Enrollment Forms, National Committee of Vital and Health Statistics (NCVHS) Subcommittee on Standards, pp. 1-6, Nov. 15, 2010.
Irfan Ahmad, "Payments Processor Perspective on EFT Enrollment," Hearing 2—Section 10109 of the Affordable Care Act Provider Enrollment Forms, National Committee of Vital and Health Statistics (NCVHS) Subcommittee on Standards, pp. 1-5, Nov. 18, 2011.
Item Processing Leaps Ahead with VisualImpact and Windows NT. (Sponsored Supplement: Unlock Your Back Office with Microsoft BackOffice), US Banker, vol. 105, No. 6, p. S4(3), 4 pages (Jun. 1995).
J. Estep, "Ninth National Medical Banking Institute, The Growing Collaboration of eHealth and Medical Banking, Banks Engaging in Healthcare Reform," pp. 1-20, Feb. 21, 2011.
J. Steven Stone et al., "Healthcare Reform: What Does it Really Mean for Banks?," NACHA, pp. 1-37, 2011.
J.P. Morgan, "Addressing the Administrative Cost Trajectory in a New Environment," Post-Reform Opportunities for Healthcare Payments, pp. 1-14, Apr. 27, 2010.
Janusky, FSTC Interbank Check Imaging, 6 pages (Apr. 29, 1996).
Janusky, FSTC Interbank Check Imaging, 7 pages (May 22, 1996).
Jim St. Clair et al., "Ninth National Medical Banking Institute, The Growing Collaboration of eHealth and Medical Banking, Banking Platforms: Creating Programs to Speed Innovation in Healthcare," pp. 1-28, Feb. 11, 2011.
Joint Marketing & Referral Agreement Between ACS Image Solutions, Inc. and JPMorgan Chase Bank, 27 pages (Mar. 15, 2002).
JPMorgan Chase and DataTreasury Settle Patent Dispute, Company Announcement, DataTreasury Corporation, http://www.finextra.com/fullpr.asp?pf=y&id=4989, 1 page (Jul. 6, 2005).
Kingman III et al., "Operational Image Systems: A New Opportunity," IBM Systems Journal, vol. 29, No. 3, pp. 304-312 (1990).
Kingson et al., "E-Processing by Banks: Idea Gains Ground," American Banker, 2 pages (Apr. 26, 2001).
Kniskern, "Engineering a Visionary Solution," Datamation, vol. 36, No. 8, pp. 1-3 (Apr. 15, 1990).
Kniskern, J.M., "Strategic Rethinking," 6 pages (date unknown).
Kutler, "AT&T, IBM and Unisys Join Bank Research Group. (Financial Services Technology Consortium)," American Banker, vol. 159, No. 124, p. 14(1), 3 pages (Jun. 29, 1994).
Lee et al., NOVAHID: A Novel Architecture for Asynchronous Hierarchical, International, Distributed, Real-Time Payments Processing, IEEE Journal on Selected Areas in Communications, vol. 12, No. 6, pp. 1072-1087 (Aug. 1994).
MagTek Adds Enhanced Reading to MICRImageTM—New Reading Capability Supports Check Conversion with Higher Reliability, MagTek Press Release, 3 pages (Jan. 9, 2003).
MagTek Unveils Excella, a Dual-side Scanner for Check 21 Applications, 1 page (May 10, 2004).
MagTek Upgrades its MICRImageTM Check Reader/Scanner—V. 34 Modem Supports High-Speed Image Archiving for Check Conversion, MagTek Press Release, 3 pages (Jun. 12, 2002).
MagTek's MICRImage Transmits Check Images at Speed of Ethernet, MagTek Press Release, 2 pages (Feb. 14, 2002).
Mantel, "Notes Gets in the Picture," Datamation, pp. 87 & 88 (Jul. 15, 1992).
Marjanovic, "Home Loan Bank to Offer Check-image Statements to Members' Customers. (Federal Home Loan Bank of Pittsburgh)(Brief Article)," American Banker, vol. 159, No. 248, p. 14(1), 2 pages (Dec. 29, 1994).
Marjanovic, "Mich. National Streamlines Imaging with IBM System. (check imaging)," American Banker, vol. 160, No. 176, pp. 1-2 (Sep. 13, 1995).
Marjanovic, "Payment Groups Square Off Over Electronic Check Plan," American Banker, 1 page (May 8, 1996).
Matt Brodis et al., "Best Practices for Migrating Healthcare Payments to ACH," pp. 1-39, Apr. 3-6, 2011.
Matthew Smith and Victoria Terekhova, "Electronic Payments in Healthcare: Overcoming the Challenges," pp. 1-25, Apr. 3-6, 2011.
Mcginn, "IBM ImagePlus High Performance Transaction System. (IBM Harnesses Image Processing to Make its 389x/XP Cheque Processors More Efficient)(Product Announcement)," Computergram International, No. 1389, p. CG103210008, 2 pages (Mar. 21, 1990).
Messmer, "Hurdles Stand in Way of Electronic Checking," Network World, p. 33, 1 page (Sep. 4, 1995).
Messmer, E., "Banks Turn to Web for Check Processing," Network World, Framingham, vol. 17, Issue 25, 3 pages (Jun. 19, 2000).
Methodology and Value, Image Archive Forum, 20 pages (Sep. 19, 1997).
Meyerson, "PACES Redeposit Processing," pp. 1-60 (no date available).
MICR Technology Helps Eliminate POS Check Fraud, Chain Store Age Executive, p. 79 (Sep. 1991).
"Microsoft Introduces SNA Server Version 3.0, Begins Beta Testing," Microsoft Press Release, http://www.microsoft.com/presspass/press/1996/jun96/sna30pr.mspx, 4 pages (Jun. 17, 1996).
Minoli, D., "Imaging in Corporate Environments Technology and Communication," McGraw-Hill, Inc., 315 pages (1994).
Moore, "IBM, Unisys Test Check Systems for Fed Reserve," Federal Computer Week, vol. 6, No. 21, p. 6(2), 1 page (Jul. 27, 1992).
Moreau, "Payment by Authenticated Facsimile Transmission a Check Replacement Technology for Small and Medium Enterprises—Payment Processing Overview," CONNOTECH, http://connotech.com/PAYPROC.HTM, 23 pages (Downloaded Nov. 25, 2006).
Morris et al., "Image System Communications," IBM Systems Journal, vol. 29, No. 3, pp. 371-383 (1990).
Morton, W., "E-Commerce (A Special Report): A Consumer's Guide—Payments—Check it Out: The Web is suddenly crowded with online-payment services; Here's how they compare," The Wall Street Journal, New York, NY, p. R13, 4 pages (Dec. 10, 2001).
Murphy, POD Check Imaging Faces New Challenges (In 1995 vs 1996, banks raised investment in check imaging by 9% from $198 mil and $215 mil; new low cost POD technology keeps it down), Bank Technology News, vol. 10, No. 3, p. 23, 3 pages (Mar. 1997).

(56) References Cited

OTHER PUBLICATIONS

National City, NCR Form Strategic Imaging Partnership, AT&T News Release, http://www.att.com/news/1192/921109.nca.html, 3 pages (Nov. 9, 1992).
NCR, CKI to Market Image-based Credit Card Chargeback System, AT&T News Release, http://www.att.com/news/0193/930106.ncb.html, 2 pages (Jan. 6, 1993).
NCR and Arkansas Systems Announce Strategic Alliance, AT&T News Release, http://www.att.com/news/0793/930712.ncb.html, 2 pages (Jul. 12, 1993).
NCR and Cincinnati Bell Offer Image Processing Service, AT&T News Release, http://www.att.com/news/0194/940111.nca.html, 2 pages (Jan. 11, 1994).
NCR and NYCH to Develop Image-based Check Notification System, AT&T News Release, http://www.att.com/news/0892/920824.ncb.html, 2 pages (Aug. 14, 1992).
NCR and Signet Banking to Provide Item Processing Services, AT&T News Release, http://www.att.com/news/0793/930713.ncb.html, 2 pages (Jul. 13, 1993).
NCR Demonstrates Full Line of Retail Products at NFR Conference, AT&T News Release, http://www.att.com/news/0193/930118.ncd.html, 3 pages (Jan. 18, 1993).
NCR Demonstrates Systems for Insurance and Accounting Industry, AT&T News Release, http://www.att.com/news/0592/920531.nca.html, 3 pages (May 31, 1992).
NCR Deposit Processing Technology Speeds Banking Operations, AT&T News Release, http://www.att.com/news/1292/921207.ncc.html, 3 pages (Dec. 7, 1992).
NCR Document Management System Includes Kodak, Ricoh Products, AT&T News Release, http://www.att.com/news/0493/930406.ncc.html. 3 pages (Apr. 6, 1993).
NCR Introduces Scalable Image Item Processing Solution, AT&T News Release, http://www.att.com/news/0196/960119.nca.html, 3 pages (Jan. 19, 1996).
NCR Offers New Image-Based Document Management System, AT&T News Release, http://www.att.com/news/0692/920623.ncb.html 3 pages (Jun. 23, 1992).
NCR Reports—Financial Services Trends & Technologies, NCR Corporation, Issue 4, 6 pages (1997).
NCR Signs DSI Alliance for Imaging Statement Processing, AT&T News Release, http://www.att.com/news/0792/920720.nca.html, 2 pages (Jul. 20, 1992).
NCR Unveils Client-Server Check Imaging (NCR introduced NCR Scalable Image Item Processing Solution, a client-server based system for image-based check processing), Bank Technology News, vol. 9, No. 3, p. 23, 1 page (Mar. 1996).
New ATM from AT&T GIS Features Automated Document Processing, AT&T News Release, http://www.att.com/news/1194/941129.ucb.html 4 pages (Nov. 29, 1994).
New Mexico Uses NCR Imaging Systems for Tax, Revenue Processing, AT&T News Release, http://www.att.com/news/0793/930712.ncc.html, 2 pages (Jul. 12, 1993).
"New Universal Payment Identification Code Will Become Industry Standard for I-Enabled Payments," The Clearing House Press Release, 2 pages (Apr. 24, 2001).
"New York Clearing House—A Proposal for an Image-based Return Item Processing System," Unisys, Document No. PDC 1010-16, 126 pages (Jun. 1991).
News Release, Retail Banking Solution Enhanced, AT&T News Release, http://www.att.com/news/0590/900521.nca.html, 2 pages (May 21, 1990).
"Ninth National Medical Banking Institute, The Growing Collaboration of eHealth and Medical Banking, Himss G7 Operating Rules in Healthcare," pp. 1-11, Feb. 15, 2011.
Nixdorf Computer Introduces DCPA Image—A Sophisticated Document Image Processing System with Unglue Capabilities, PR Newswire, 3 pages (Aug. 15, 1989).
Nixon, "Is Check Imaging for You? (automation in banking)(includes related articles)," Savings & Community Banker, vol. 2, No. 10, p. 28(6), 6 pages (Oct. 1993).

Norwest Bank Selects NCR Image-based Processing Systems, AT&T News Release, http://www.att.com/news/0893/930802.nca.html, 3 pages (Aug. 2, 1993).
Nugent, W.R., "Specifications for a Stack Droid: Robotics Required For Large Libraries of Digitized Images on Optical Disk," 1 page (date unknown).
"NYCH Project Shows Promise for Facilitating E-Payments," AFP Pulse, The News Source for Financial Professionals, 2 pages (Mar. 2002).
O'Heney, Prepare for The Image Revolution. (Bankers and Vendors)(image processing; includes related article listing image processing products)(buyers guide), Computers in Banking, vol. 6, No. 10, p. 24(6), 8 pages (Oct. 1989).
On the ImagingTechnology Front (Unisys Corp is in an accord to Remarket Broadway & Seymore Inc's VisualImpact software, a midrange check-imaging system), American Banker, vol. CLXI, No. 68, p. 26, 1 page (Apr. 10, 1996).
"PACES—Paperless Automated Check Exchange & Settlement—Business Requirements," FSTC, PACESBusReq3[1].doc, 7 pages (Apr. 3, 1998).
PACES—Paperless Automated Check Exchange & Settlement—Project Proposal, FSTC, PACESPRO[1].doc, 25 pages (Apr. 23, 1998).
PACES—Paperless Automated Check Exchange & Settlement—Requirements Document, FSTC, PACESRequirements[1].doc, 25 pages (Apr. 3, 1998).
Padgett, T., "Melville, N. Y.—Based DataTreasury Fights J.P. Morgan Chase over Patent," Newsday, 4 pages (Oct. 22, 2003).
Paperless Automated Check Exchange and Settlement (PACES), FSTC Projects, http://www.fstc.org/projects/paces/projstatus.cfm, 2 pages (Jun. 22, 2000).
"Payment Trends in the Healthcare Industry," A Survey of Healthcare Providers, pp. 5-38, Fall 2010.
Perry et al., "Experience Gained in Implementing ImagePlus," IBM Systems Journal, vol. 29, No. 3, pp. 467-488 (1990).
Plesums et al., "Large-Scale Image Systems: USAA Case Study," IBM Systems Journal, vol. 29, No. 3, pp. 343-355 (1990).
Priya Malhotra, "Clearing House Enumerates e-Payment Ills," American Banker, 4 pages (Aug. 13, 2002).
"Real-Time Gross Settlement Systems," Bank for International Settlements, 66 pages (Mar. 1997).
Regions Bank Selects ImageSoft to Provide Imaging Solution, Business Wire, p. 9161220, 2 pages(Sep. 16, 1997).
"Request for Proposal for Check Image Processing and Archival and Retrieval Systems for the Federal Reserve," Federal Reserve Bank of Boston, Version 1.0, 246 pages (Apr. 21, 1994).
Richard D. Marks, "Ninth National Medical Banking Institute, The Growing Collaboration of eHealth and Medical Banking, Health Record Banking: Changing the Game for Healthcare Information Technology, An Analysis of Checking Accounts for Health Information," pp. 1-13, Feb. 10, 2011.
Rivest et al., "A Method for Obtaining Digital Signatures and Public-Key Cryptosystems," 15 pages (Feb. 1978).
Robert Hunter, "Letter Re: CMS-0024-IFC, Adoption of Standards for Health Care EFTs and Remittance Advice," pp. 1-10, Mar. 12, 2012.
Roldan, Jr., "Image Quality White Paper," FSTC Paces Project Document, Chase Manhattan Bank, pp. 1-18 (Feb. 18, 1999).
Roldan, PACES—Paces Models—FSTC Project, Chase Manhattan Bank, 19 pages (Jul. 17, 1997).
Roldan, "Project Overview—PACES Planning Meeting", New York City, FSTC, PacesOverview40[1].ppt, 28 pages (Dec. 19, 1997).
Roth, A., "Banks Fund B2B Payment System Effort," American Banker, 1 page (Apr. 24, 2001).
Russ Waterhouse, "Administrative Simplification under the Patient Protection and Affordable Care Act Standards and Operating Rules for Electronic Funds Transfer (EFT) and Remittance Advice (RA)," National Committee of Vital and Health Statistics (NCVHS) Subcommittee on Standards, pp. 1-11, Dec. 3, 2010.
Russ Waterhouse, "National Committee on Vital and Health Statistics (NCVHS) Subcommittee on Standards, Administrative Simplification Under the Patient Protection and Affordable Care Act,

(56) References Cited

OTHER PUBLICATIONS

Standards and Operating Rules for Electronic Funds Transfer (EFT) and Remittances Advice (RA)," The Clearing House, pp. 1-5, Dec. 3, 2010.
Russ Waterhouse et al., "The Healthcare Payments Solution: What's in it for the Banking Industry," NACHA Payments 2011, pp. 1-17, Apr. 5, 2011.
Ryman, "Personal Systems Image Application Architecture: Lessons Learned from the ImagEdit Proaram," IBM Systems Journal, vol. 29, No. 3, pp. 408-420 (1990).
"SAS® Fraud Management—Real-time scoring of all transactions for fast, accurate fraud detection," Product Brief, SAS, www.sas.com, 6 pages, 2015.
Scheschuk, B., "Pay it on the Net," CMA Management, vol. 75, Issue 4, pp. 30-34, 4 pages (Jun. 2001).
Schwartz, "Banks to Test Imaging for Clearing Checks," CommunicationsWeek, p. 35, 2 pages (Sep. 14, 1992).
Signet Bank Processes Over 2,500 Documents/Hour in Unisys Check Imaging Tests, PR Newswire, p. 0409P8428, 2 pages (Apr. 9, 1991).
Softchec Licenses 'Envision' Image Solution to West Suburban Bank, PR Newswire, p. 116SETU002, 2 pages (Jan. 16, 1996).
Spencer, "Scanning Goes Vertical: A Big Future for Specialized Check Scanning; Check Scanning Technology," Advanced Imaging, pp. 42-44 (Oct. 1997).
Stanley, P., "Pilot Overview," 8 pages (Apr. 3, 1995).
"Supplement to Authentication in an Internet Banking Environment," Federal Financial Institutions Examination Council, http://www.ffiec.gov/pdf/auth-its-final%206-22-11%20(ffiec%20formated).pdf, pp. 1-12, published 2011.
"SurePOS ACE Electronic Payment Support PRPQ for 4690 OS User's Guide," Version 1, Release 5, IBM, 281 pages (Mar. 2002).
"Suspicious Activity Monitoring—Anti-Money Laundering Solutions," NICE-Actimize, www.niceactimize.com, 4 pages, Mar. 15, 2014.
Technical Volume—Check Image Processing Archive and Retrieval System—Proposal, BancTec, Inc., 469 pages (Jul. 8, 1994).
Ten Dyke, R.P., "Books," IBM Systems Journal, vol. 29, No. 1, pp. 489-490, 2 pages (1990).
Terminal Data to Supply NCR with Document Microfilmers, AT&T News Release, http://www.att.com/news/1093/931013.nca.html, 2 pages (Oct. 13, 1993).
"The Bank Internet Payment System (BIPS): Leading the Way to Electronic Commerce," FSTC, http://www.fstc.org/projects/bips/index.cfm, 3 pages (Downloaded Feb. 27, 2003).
The Check Information Age, Vision Executive Summary Image Archive Forum, Payment System Task Force, 10 pages (Jan. 27, 1998).
The Clearing House, "Healthcare EFT Enrollment, Mar. 25, 2011 Stakeholder Meeting Minutes & Wrap-Up," NACHA—The Electronic Payments Association, pp. 1-22, Apr. 20, 2011.
The Clearing House, "Healthcare EFT Enrollment, Stakeholder Meeting Materials," NACHA—The Electronic Payments Association, pp. 1-43, Mar. 25, 2011.
The Clearing House, "Healthcare EFT Enrollment, Stakeholder Meeting: Pre-read Materials," NACHA—The Electronic Payments Association, pp. 1-21, Mar. 25, 2011.
The Clearing House, "Mayo Clinic Interview," Healthcare EFT Enrollment, NACHA—The Electronic Payments Association, Healthcare EFT Enrollment, pp. 1-6, Mar. 14, 2011.
The New Era of Check Scanning Technology—Introducing Excella, Specifically Designed to Meet the Processing Requirements of Check21, MagTek, Inc., 22 pages (2005).
"The Remaining Barriers to ePayments and Straight-through Processing," Research Conducted Oct. 2001-Mar. 2002 by The Clearing House, The Clearing House, 24 pages.
The Wachovia Story, RDM Corporation, 1 page (Oct. 1993).
Tracey, "IBM Unveils First Stage of Image-check System (product announcement)," Computers in Banking, vol. 7, No. 4, p. 13(3), 3 pages (Apr. 1990).
Tucker, "Broadway Rolls Out Check Imaging System for Community Banks (Broadway & Seymour Inc.)," American Banker, vol. 160, No. 61, p. 14(1), 2 pages (Mar. 30, 1995).
Understanding EDI, 2 pages (Mar. 2, 1996).
Unisys Acquires VisualImpact Solution for Check Processing, Archive & Image Delivery, Business Wire, p. 9181204, 3 pages (Sep. 19, 1997).
Unisys Enhances Check Imager (Unisys Corp. Makes Effort to Appeal to Wider Range of Financial Institutions), American Baker, vol. CLIX, No. 205, p. 15A, 1 page (Oct. 24, 1994).
Unisys Enters Image Processing Market with Two New Products and Major Financial and Industrial Customers. (product announcement), PR Newswire, p. 1011PH009, 3 pages (Oct. 11, 1989).
Unisys Integrates Retail/Wholesale Lockbox Solution for Remittance Processors, Business Wire, p. 03251075, 4 pages (Mar. 25, 1997).
Unisys Provides Services to Bank of the West to Support Retail Banking, Business Wire, p. 9180098, 2 pages (Sep. 19, 1995).
Unisys Solution will Support Check Processing at Vermont Federal, Business Wire, p. 5201185, 3 pages (May 20, 1996).
Unisys Wins Contract to Supply Imaging Solution to Chase Manhattan/FISERV Check Processing Alliance, Business Wire, p. 6121175, 2 pages (Jun. 12, 1995).
Unix-based Imge Statement Software (Cincinnati Bell Information Systems Inc. introduces ImageBanc II computer software) (Brief Article), ABA Banking Journal, vol. 85, No. 2, p. 80(1), 1 page (Feb. 1993).
Universal Card Purchases BancTec ImageFIRST System, AT&T News Release, http://www.att.com/news/1292/921222.uca.html, 2 pages (Dec. 22, 1992).
U.S. Office Action for U.S. Appl. No. 15/488,848 dated Aug. 7, 2019.
U.S. Appl. No. 14/926,112, filed Oct. 29, 2015 entitled "Secure Payment Processing".
Verifone Software Links PCs to the Point of Sale (Brief Article), American Banker, vol. 158, No. 156, p. 13A(1), 2 pages (Aug. 16, 1993).
Vermeire, D.R., "Prosecution of Check Image Patent," letter to Peter Hanna, 1 page (Jul. 11, 1997).
Wachovia Tests NCR's New Imaging Item Processing System, AT&T News Release, http://www.att.com/news/1091/911015.nca.html, 2 pages (Oct. 15, 1991).
Wagner, "Banc One Checks Out Web," Computerworld, vol. 30, No. 35, p. 69, 2 pages (Aug. 26, 1996).
Walter, G. "Making Optical Disk Based Systems Pay," Electronic Imaging '88—Advanced Printing of Paper Summaries, vol. 1, Oct. 3-6, 1988, Boston, MA, 11 pages.
Western Bank Purchases NCR's Document Managing System, AT&T News Release, http://www.att.com/news/0893/930831.nca.html, 3 pages (Aug. 31, 1993).
What is a Financial Transaction Switch?, NCR Reports—Financial Services Trends & Technologies, NCR Corporation, vol. 1, Issue 6, 6 pages (1997).
Winig, E., "Cracking the Code," Washington Business Journal, vol. 20. No. 11, 2 pages (Jul. 20-26, 2001).
Wong et al., FSTC Check Image Quality Subproject Status and Project Plan Update, 6 pages (May 22, 1996).
You Have Requested Data From 32 Answers—Continue? Y/(N): Y, INSPEC, pp. 175-198 (2001).
"Proposal to Faster Payments Task Force," Faster Payments Qiat, The Clearing House and FIS, Feb. 21, 2017, 170 pages.
Caron, in "The Evolving Payments Landscape," in IEEE Compute Society, 2018 (Year: 2018).
"TCH Real-Time Payments BAFT/ABA Global Payments Symposium," The ClearingHouse, Jul. 14, 2016, 6 pages.
Davey, Peter, "Real-Time Payments: Addressing Decades-Old Chalenges Facing Treasury Professionals," The ClearingHouse, Mar. 2017, 28 pages.
"Information Interchange 2016—Hit it Out of the Park with Payments!", EastPay, Mar. 2, 2016, 6 pages.
"TCH Real-Time Payments," The ClearingHouse, Mar. 9, 2016, 18 pages.

(56) References Cited

OTHER PUBLICATIONS

"TCH Real-Time Payments," The ClearingHouse, Feb. 17, 2016, 12 pages.
"TCH Real-Time Payments Briefing for the OCC," The ClearingHouse, Mar. 18, 2016, 6 pages.
"TCH Real-Time Payments," The ClearingHouse, Oct. 7, 2016, 13 pages.
Ledford, Steve, "Real-time Payments Overview," The ClearingHouse, Oct. 3, 2016, 9 pages.
"Real-Time Payments Operations Playbook, Version 1.01," The ClearingHouse, May 2016, 48 pages.
"TCH Real-Time Payments," The ClearingHouse, Aug. 19, 2016, 17 pages.
"Appendix: Payment Opportunities Detail," The ClearingHouse, Real-time Payments Stockholder Engagement Session, New York, Jun. 14-15, 2016, 46 pages.
"U.S. Real-Time Payments Business Playbook, Version 1.03," The ClearingHouse, Mar. 2016, 45 pages.
"U.S. Real-Time Payments Technology Playbook, Version 1.0," The ClearingHouse, Nov. 2016, 35 pages.

\* cited by examiner

BILL PAY SERVICE WITH FEDERATED DIRECTORY MODEL SUPPORT

CROSS-REFERENCE TO RELATED APPLICATION

This application claims priority to U.S. patent application Ser. No. 15/970,058 filed May 3, 2018, now U.S. Pat. No. 11,436,577. Co-pending U.S. patent application Ser. No. 15/488,848, filed Apr. 17, 2017, which is a continuation-in-part of U.S. patent application Ser. No. 15/200,340, filed Jul. 1, 2016, now U.S. Pat. No. 11,042,882, which claims priority to U.S. Provisional Patent Application No. 62/187,406, filed Jul. 1, 2015, and U.S. Provisional Patent Application No. 62/286,738, filed Jan. 25, 2016, the contents of all five applications are incorporated by reference herein in their entirety, as if set forth fully herein.

BACKGROUND

Field

Example aspects herein relate generally to electronic transactions and, more specifically, to electronic real-time payment and non-payment transactions, billing, and also to directory services for electronic transactions.

Description of the Related Art

The average banking customer interacts with his or her bank or financial institution at least twice a day for payment-related matters, such as buying a financial product, checking on a payment, or paying a bill. These interactions represent more than 80 percent of customer interactions with banks, making payments a superb platform, or beachhead, for deepening customer relationships with regard to financial services. Indeed, payment revenue is increasingly targeted by non-banks, and, missing out on these fees could detrimentally impact the capture of all possible banking related revenue.

Banks typically offer customers the ability to pay bills from their bank accounts using services such as online banking, for example. However, such existing services have imperfections. For example, a bank customer (e.g., a payor) typically has to first register or set up a bill pay payee in their online bank account before being able to make a payment from the bank account to the bill pay payee. Setting up a bill pay payee can be burdensome and confusing because often times bill pay payees may have various subsidiaries and related entities that share similar names, but often with different addresses, making it difficult to identify the correct bill pay payee for a particular transaction. Further adding to the confusion is that often bill pay payees have multiple bank accounts, or the payor may have multiple account numbers at a particular biller. For example, a customer may have more than a single account and account number in association with a service (e.g., a cellular service) provided by a particular biller (e.g., a cellular service provider). Compounding these areas of confusion is that a bank customer often does not know if the bill pay payee has been correctly set-up before making a payment. Thus, a bank customer may discover, after the fact, that a payment was misdirected and/or misapplied only after the payment was attempted or effected. This can result in non-payments, and payment delays, and lead to late fees being charged, and the like.

In view of the above challenges, most bank customers prefer to pay their balances through services offered by the payee instead of through their online bank account services. Typically, most commercial payees operate a website that allows customers to pay a balance they may owe to the payee. However, this method of payment is also burdensome for a customer because the customer will need to create log-on credentials in order to access the website operated by the payee, and customers typically pay bills to numerous payees, thus making it difficult to keep track of multiple log-in credentials for various payees. Furthermore, and perhaps even more importantly, websites operated by payees are often targeted by cyberattacks, and confidential banking information belonging to customers can be susceptible to being stolen through such attacks. Thus, paying bills through websites operated by payees can expose customers to fraud and identity theft, in addition to being unwieldy to manage.

Further complicating matters is that there is no ubiquitous centralized directory that contains banking information for various payees and payors. Traditionally, banks either directly or by way of a third party service, have operated and maintained proprietary directories that include banking information, such as bank account numbers and associated routing numbers for various parties. However, operating, maintaining, or employing these directories is expensive, and traditional directory services may contain inconsistent, different, or incorrect information. Pricing for directory services also can vary among different directory services. Moreover, it is too cost prohibitive and labor intensive to create a new uniform and all-encompassing single directory service from scratch that would not suffer from fragmentation and thus, many banks and financial institutions must rely on the fractured directory services currently in existence in order to process banking transactions.

In view of the foregoing, there is a need to develop and implement an improved payment system and directory service that eliminate the aforementioned limitations.

BRIEF SUMMARY

The example embodiments discussed herein address the challenges in the art discussed above, by providing methods, and systems, apparatuses, computer-readable media, and computer programs that operate in accordance with the methods, for performing real-time clearing and payment settlement transactions.

In one aspect, the example embodiments enable existing bill pay service providers to have more reach. In another aspect, the example embodiments enable tokenized endpoints for both payees to receive real time payment (RTP) credits and payors to receive request for payments (RFP). In another aspect, the example embodiments enable services that can support verified single sign-on for the retrieval of detailed bill or invoice information. In one aspect, the example embodiments include a federated directory model that supports the opening-up of existing directory services via a single interface. In one aspect, the federated directory model can support multiple pricing models allowing directory providers to set their pricing for data. According to one example embodiment herein, a method is provided for conducting a financial transaction. The method comprises receiving a request for endpoint data, and, in response to receiving the request, determining whether one or more directories, among a plurality of directories, can provide the endpoint data requested in the request. The method also comprises identifying at least one directory, among the directories determined to be able to provide the endpoint data requested in the request, as a selection for providing the endpoint data, and obtaining the endpoint data from the at least one directory identified in the identifying.

According to another example aspect herein, the determining includes communicating with the plurality of directories to determine whether one or more of the plurality of directories can provide the endpoint data requested in the request. The method is performed by a federated directory, and further comprises determining whether the federated directory can provide the endpoint data requested in the request. The determining also can include determining a requirement by the one or more of the plurality of directories for providing the endpoint data, wherein the requirement includes a price.

According to another example aspect herein, the identifying includes receiving an indication of the selection of the at least one directory, and the method further comprises providing a notification specifying directories that are determined to be able to provide the endpoint data requested in the request, wherein the selection of the at least one directory is a selection of one or more of the directories specified in the notification. The notification can be provided in the providing to one of a payor entity or payee entity, and the indication is received from the one of the payor or payee entity. The selection also may be based on predetermined criteria, such as a price.

In one example aspect of the present application, the endpoint data includes at least one of a bank account number and a bank routing number. In another example aspect, the method further comprises obtaining at least one token identifier based on the at least one of the bank account number and the bank routing number. The at least one token identifier is a mask for the at least one of the bank account number and the bank routing number.

According to still another example embodiment herein, the selection is performed based on at least one bid. In still another example embodiment herein, the method further comprises receiving a transaction message that includes at least one token, and correlating the at least one token to at least one of a bank account number or a bank routing number. The transaction message is one of a request for payment message or a payment message. The method also can include routing the transaction message to a destination based on at least the bank routing number.

Further features and advantages, as well as the structure and operation, of various example embodiments are described in detail below with reference to the accompanying drawings.

DETAILED DESCRIPTION

Figure 1:
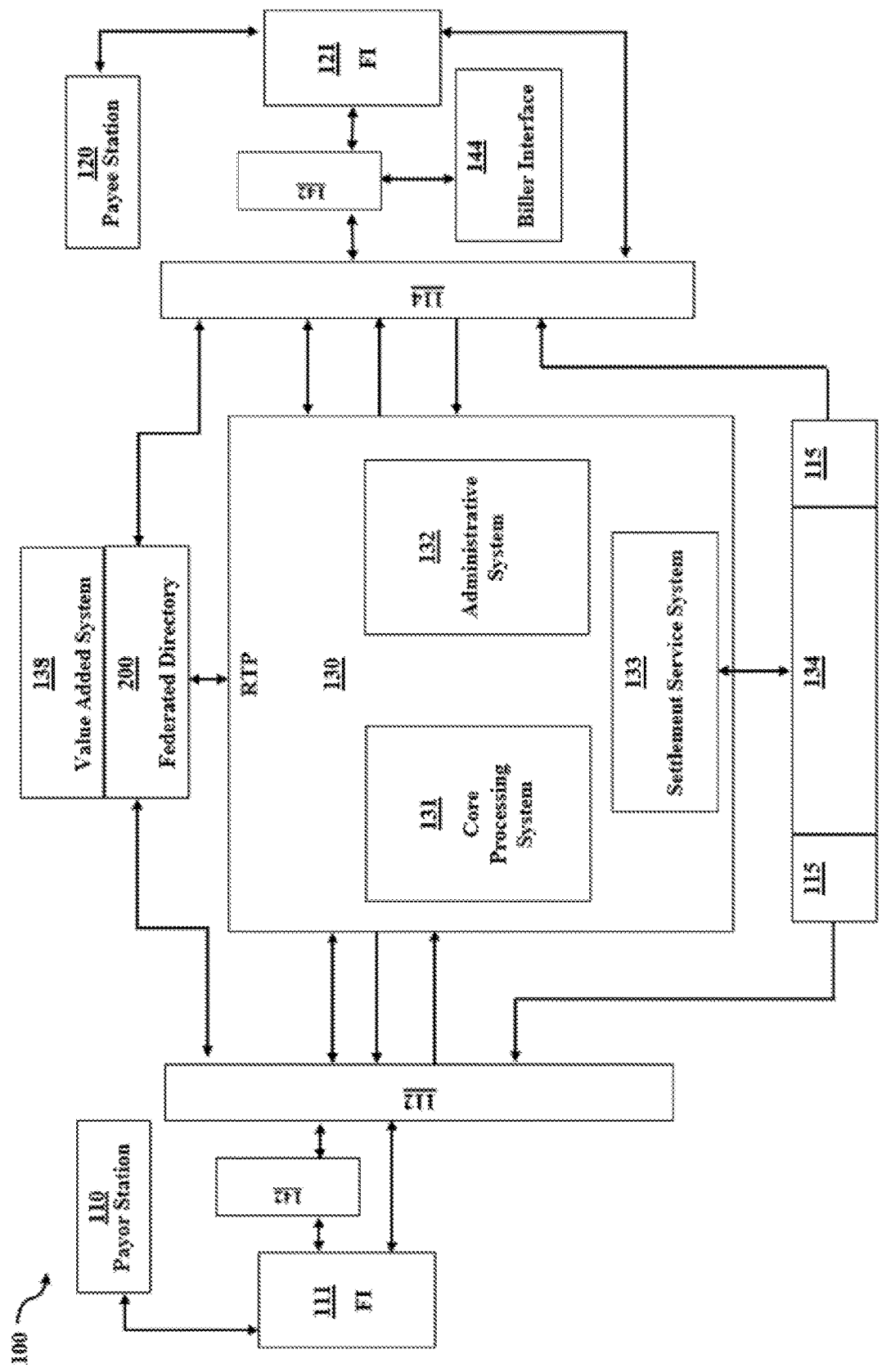
FIG. 1 is a diagram of an example transaction system that includes a real time payments system according to an example embodiment herein.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a diagram of a transaction system 100 configured in accordance with an example embodiment herein. The transaction system 100 includes user stations 110 and 120. In an example embodiment, user station 110 is operated by, under the authorization of, or on behalf of a payor (e.g., an individual, business, government, etc.), and user station 120 is operated by, under the authorization of, or on behalf of a payee (e.g., an individual, business, government, etc.). In this example, the payor may owe one or more debts, or may otherwise seek to make payments, to the payee. Accordingly, user station 110 can be referred to as a "payor station," and user station 120 can be referred to as a "payee station." Each user station may be, for example, a computer, a tablet computer, a server, a personal computer, a smartphone, a standalone computer terminal such as a kiosk or ATM, or any other suitable type of electronic device for receiving, transmitting, storing, and/or processing information.

The transaction system 100 also includes financial institutions (FIs) 111 and 121. In an example embodiment, a payor associated with station 110 can receive banking services (e.g., account services such as access to demand deposit accounts and savings accounts, brokerage services, and electronic bill payment and present services and the like) from FI 111. Similarly, a payee associated with station 120 receives banking services from FI 121. Accordingly, FI 111 can be referred to as a "payor FI" and FI 121 can be referred to as a "payee FI." Each FI includes one or more computers and/or servers, such as, for example, the system of FIG. 3, which are configured to handle electronic financial transactions.

Payor station 110 is connected to (e.g., can electronically communicate with) payor FI 111. Accordingly, the payor may use station 110 to access banking services provided by FI 111 through, for example, an online banking portal available through, for example, a mobile application and/or a web browser running on station 110, banking software loaded on to station 110, or any other banking service provided by FI 111 on station 110. Similarly, payee station 120 can be connected in a similar manner to payee FI 121. Stations 110 and 120 also may connect to other elements as well, such as other elements of system 100.

Payor FI 111 and payee FI 121 are connected to each other by a network 130 (also referred to as a Real Time Payment (RTP) network). In one example embodiment, the network 130 is not an automated clearinghouse (ACH) network, although in other embodiments it can be an ACH network (e.g., such as, without limitation, one or more of the Electronic Payments Network (EPN) and the FedACH). The network 130 can route (e.g., receive and transmit) electronic transactions and various types of messages between FIs via interfaces (e.g., gateways) 112 and 114, as described below. The network 130 can include one or more computers and/or servers (such as, for example, the system shown in FIG. 3) which are configured to handle electronic financial transactions. The network 130 also can include one or more databases. Although represented as a single network 130, there may be more than one such network. For example, one such network can include the RTP network and another such network can include an ACH network.

Each connection illustrated in FIG. 1 can be any suitable type of existing or later-developed connection between one or more computers (or computing devices). In one example, at least part of one or more of such connections may include a network such as a local-area network (LAN), wide-area network (WAN), or the Internet. For example, station 110 may be a computing device (e.g., a PC or smartphone) that connects, via the Internet, to one or more web pages maintained or hosted by or on behalf of FI 111.

In one example embodiment, stations 110 and 120 can be connected together and/or with other elements of the system 100 (including, without limitation, biller interface 144), either directly or indirectly, by a secure communication channel on which communications may proceed after a single sign-on (SSO) procedure is performed in which a member using station 110 logs in to an online banking service provided by FI 111, although this example is neither limiting nor exclusive. In such a procedure, payor FI 111 can be configured as a SAML identity provider, station 120 can be configured as a SAML service provider, and/or other elements can be configured as a SAML identity provider. Accordingly, through communication between FI 111 (as the SAML identity provider) and station 120 (as the SAML service provider) and/or other elements, a secure communication channel between station 110 and 120 and/or other elements can be established. In one example embodiment, such a secure communication channel is provided by way of network 130, which enables the SSO procedure to be effected.

RTP network 130 includes a core processing system 131, an administrative system 132, and a settlement system 133. RTP network 130 can also include one or more databases. Generally, core processing system 131 performs processes such as payment processing, message validation, duplicate message checking, transaction state management, acknowledgements, non-payment messaging processing, administrative message processing, and system message processing. The core processing system 131 also performs processes such as message routing, transaction routing, routing to a value added service system (to be described below), and endpoint fraud management. The system 131 also performs processes such as system security processes, authorization and authentication, user access management, and fraud detection.

The administrative system 132 performs administrative processes such as operations processing, participant onboarding, helpdesk and customer service, control room system monitoring, data management, conducting inquiries and investigations, and bank administration. Additionally, system 132 performs reporting processes such as a dashboard, operations reporting, statistics reporting, performance reporting, pricing and billing, regulatory reporting, and internal audit reporting. The administrative system 132 also performs governance and rules management processing, maintains business rules, effects change management, participant management, audits, and risk management.

The settlement service system 133 performs settlement processing to enable financial transactions to be settled. In one embodiment, the settlement service system 133 manages multilateral net settlement positions and/or non-multilateral net settlement positions (such as, e.g. on a transaction-by-transaction basis), settlement notifications, and transmits/receives data to/from at least one settlement facility 134. That facility 134 also can communicate with the FIs 111 and 121 by way of gateways 115 and interfaces 112, 114.

The transaction system 100 also can include a value added service system 138 connected to (or within) the RTP network 130 and the FIs 111 and 121. The system 138 performs various valued-added services such as, for example, directory services and maintenance, fraud management, analysis, and reporting, and token services. In one example embodiment herein, the directory services and token services can be performed by, or in conjunction with, a federated directory 200 and/or the added service system 138 as will be described in more detail below. Various elements of the transaction system 100, such as, e.g., stations 110, 120, FIs 111, 121, RTP network 130, systems 131, 132, 133, 138, facility 143, elements 142, and biller interface 144, can include at least some parts of one or more computers and/or servers, such as, for example, the system shown in FIG. 3.

In the illustrated example, the systems 134 and 138 and federated directory 200 are represented as being separate from the RTP network 130, and at least some parts of the below description is made in the context of that example embodiment. However, it should be understood that the scope of the invention is not limited to that example only. For example, it is also within the scope of the invention for the systems 134 and 138 and directory 200 to be included in, operated by, or otherwise be a part of the RTP network 130, and one skilled in the art would understand in view of this description how to adapt the functionalities described herein where needed to accommodate such an embodiment.

The transaction system 100 further can include elements 142 such as, for example, service providers and/or other entities. Elements 142 can be those which, for example, provide a technical connection and gateway (application interface) services, and, in some cases, other value added/back office services. In other embodiments, elements 142 can be, for example, payment service providers, a third party service provider, a payee or a clearinghouse. In the transaction system 100, the third party and/or other entity can receive bills and payments from FIs 111, 121 and send them to other FIs 111, 121. Element 142 can include one or more computers and/or servers, such as, for example, the system shown in FIG. 3.

The transaction system 100 may also include biller interface 144. In one example embodiment herein, the biller interface 144 can be operated and/or maintained by the RTP network 130 and/or federated directory 200 and/or by an entity that oversees them, in one example embodiment. The biller interface 144 can be separate from the RTP network 130 and/or the federated directory 200, or it can be included in or more of these elements. In other example embodiments herein, the biller interface 144 may be operated by a payment service provider or a third party service provider (e.g., elements 142), a FI such as FI 121, or a payee associated with station 120.

Elements of transaction system 100 can be configured to perform one or more of the steps or functions associated with any of the processes discussed herein, including those illustrated in the flow diagrams shown in the Figures and those discussed in connection therewith.

Directory Services and Tokenization

Tokenization involves use of a unique code that can be used to, for example, post transactions to an account. Tokenization can be useful because a payor does not need to receive a payee's account data, but can still conduct a payment to the payee, and also there is no need for a PCI-type of security for a payor. Tokens are safe even if exposed in a cyberattack. Also, mass payment fraud can be prevented with tokens.

In one example embodiment, tokenization substitutes a limited-use random number (secure digital token) for a customer's account number so that the sensitive information remains safe. Even if compromised, a token is of limited or no use to cybercriminals. Tokenization as used in the example embodiments herein can involve various aspects. For example, tokenization can be provided in a dynamic or static manner. In the case of dynamic tokenization, the token for each transaction is unique, thus rendering the token itself unusable for any other transaction. In the case of static tokenization, the same token is used for multiple transactions, but may be restricted to prevent unauthorized use (e.g., credit only, single merchant). Still another type of restriction may include a domain restriction which provides further fraud reduction by limiting token use to a certain digital wallet, merchant, channel (e.g., e-commerce), amount, transaction type (e.g. credit or debit) or expiration date. For a token vault, bank (or multi-bank) vaults create tokens, perform customer authentication, and provision tokens to digital wallets or directories.

By virtue of the use of tokens, payors can initiate payments using an alias (e.g., a phone number, email, or etc.) which can be used to retrieve bank routing information from a directory. As such, payees do not need to provide account numbers to payors, and payors do not assume a risk of holding receiver account numbers.

The RTP network 130 enables a payee to use a bank account number pseudo-code (BANPC) and a bank routing number pseudo-code (BRNPC) as described below, for an added level of security. Similar functionality is also described in U.S. Pat. Nos. 6,173,272 and 6,317,745, both to Thomas et al. These two patents, which describe a Universal Payment Identification Code (UPIC) protocol, are hereby incorporated by reference in their entireties, as if set forth fully herein. BANPC and BRNPC identifiers can be used in effecting credit-only transactions, or both credit and debit transactions.

Figure 2:
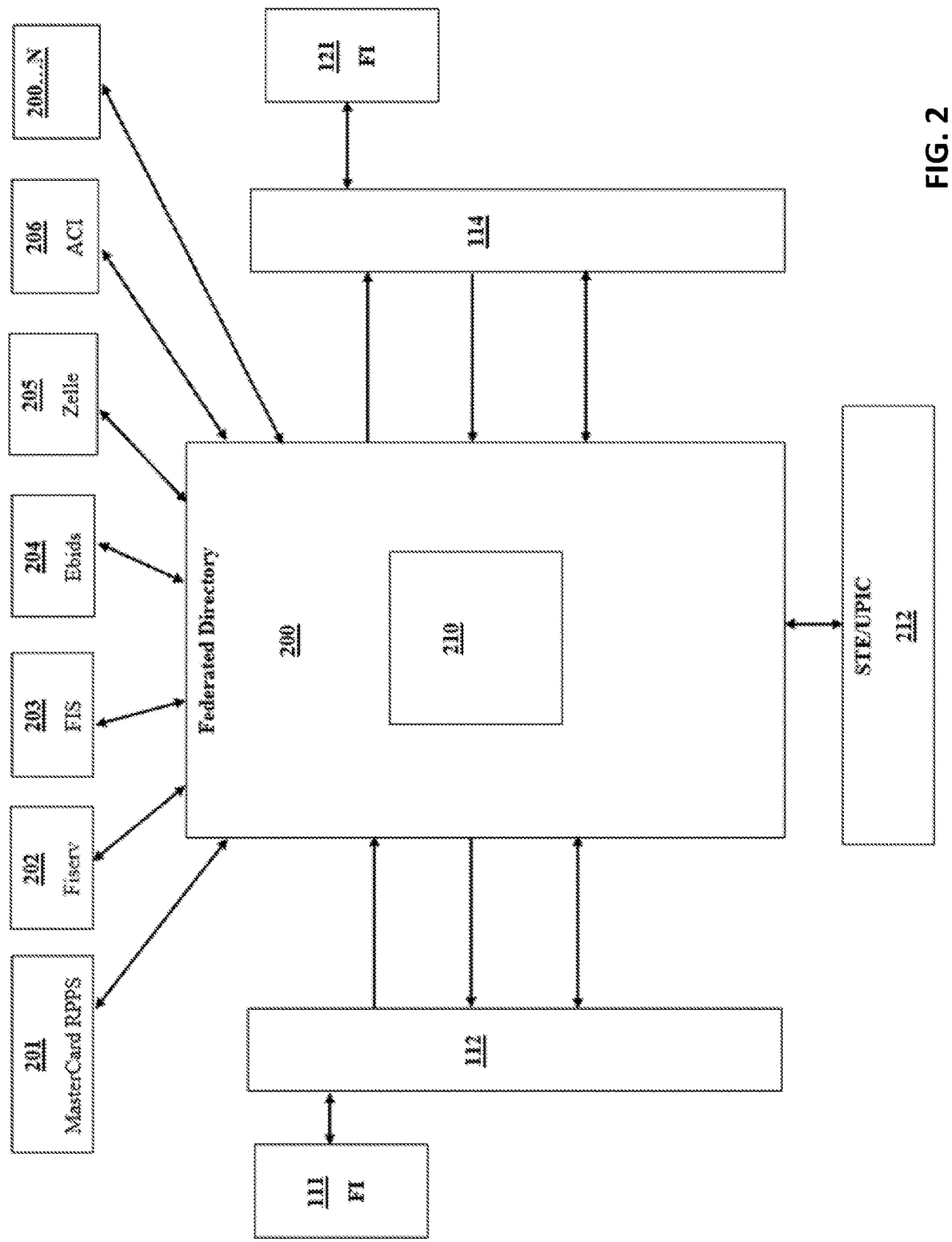
FIG. 2 illustrates an example of a federated directory in accordance with an example embodiment herein.

A BRNPC is a mask identifier for the routing number of a FI, such as FI 111 or FI 121. A BANPC is a mask identifier for the account number of a party (such as, e.g., the payee) at its associated FI (e.g., payee FI 121). In one example embodiment, the mask identifiers are in the form of tokens. For a BANPC transaction, when an electronic payment is specified to be made by a payor by way of the payor FI 111, instead of using the actual account number of the payee and the actual routing number of the payee FI, a BANPC identifier corresponding to the account number and a BRNPC identifier corresponding to the routing number are obtained and are inserted (e.g., by FI 111) into a payment transaction message in a tokenization procedure. Accordingly, the payor FI 111 is provided with a BRNPC identifier and a corresponding BANPC identifier, but not with the actual payee-related account and routing numbers. The BANPC and BRNPC identifiers collectively protect the payee's banking information and mitigate the opportunity for fraud. A detokenization procedure includes a reversal of the tokenization procedure performed, and thus includes a translation of the BANPC and BRNPC identifiers included in the payment transaction message back into the corresponding account number and routing number. In one example embodiment herein, detokenization is performed by one or more of RTP system 130, directory 200, and/or system 138. FIG. 2 depicts a federated directory 200 having a proprietary database or directory 210, in accordance with an example embodiment herein. The federated directory 200 may be separate from the RTP network 130, although in other example embodiments herein, the federated directory 200 may be included in the RTP network 130 (or in the value added service system 138). In another example, the federated directory 200 can be included elsewhere in the transaction system 100, such as at a third party or another element. Referring also to FIG. 1, the federated directory 200 can communicate with other elements of the system 100, such as, by way of example and without limitation, the network 130, FI 111 (e.g., by way of element 112), and FI 121 (e.g., by way of element 114), and other (e.g., industry) third party directories 201, 202, 200 . . . N, and any such communications can be effected directly, in one example embodiment herein, or by way of another element such as RTP network 130, in another example embodiment herein.

Examples of third party directories 201, 202, 200 . . . N include, for example, directory services provided by MasterCard RPPS, Fiserv, FIS, Ebids, Zelle, ACI, etc., although these examples are neither limiting nor exclusive. Typically, each industry directory 201, 202, 200 . . . N is owned and operated separately, and maintains its own proprietary endpoint data relating to various parties. The federated directory 200 also can maintain its own proprietary endpoint data relating to various parties, in some example embodiments. The endpoint data for a party may include, for example, an account number at a FI 111, 121 for a particular payor or payee and a corresponding routing number of the FI 111, 121, and various other types of identifying information maintained by the directories. For example, the directories may also include information such as endpoint data identifying a particular party (e.g., payor, payee), such as, for example, a name, email address, street address, phone number, etc. Additionally, in some example embodiments, the endpoint data may also include data for a single sign-on (SSO) application for inclusion on a request for payment message (RFP) or other type of message. The endpoint data maintained by more than one directory may overlap at least to some extent such that at least some of the same endpoint data may be contained in multiple directories, although in some cases there may be no overlap of endpoint data.

Also, one or more of the industry directories 201, 202, 200 . . . N, and, in one example embodiment herein, the federated directory 200, may require or have associated therewith a unique pricing structure for enabling access by others to the endpoint data maintained therein. The pricing could be dynamic, provided upon request, or published. In one example embodiment herein, endpoint data is provided to a requester only if the pricing is agreed to or otherwise paid beforehand. In another example embodiment herein, one or more of the directories may have other requirements for enabling access to endpoint data, either in addition to or in lieu of price. The federated directory 200 can communicate with a payee FI 121 and a payor FI 111 through the interfaces 114, 112, respectively, and serves as a single interface for providing and/or making available, information about, or included in, the industry directories 201, 202, 200 . . . N, as well as information about, or included in, the directory 210 of the federated directory 200. For example, the federated directory 200 can determine or poll for, and post or make available, information regarding whether endpoint data for a particular payee or payor exists in the proprietary directory 210 of the federated directory 200, and/or whether endpoint data for a particular payee or payor exists in one or more directories 201 to 200 . . . N. The federated directory 200 can also determine or poll for, and post or make available, additional information related to pricing and other criteria for enabling access to the endpoint data. If the requested endpoint data is contained in multiple directories, the federated directory 200, either directly or by way of network 130, can provide a notification indicating such to the requesting FI 121, 111 (or station 120, 110, or the party associated therewith) can decide which directory to use for obtaining the data, or, in another example embodiment herein, the decision can be made by the federated directory 200 automatically based on predetermined criteria, such as a priority order or some other criteria. In one example, a requesting party, such as FI 121 or 111, may elect to use the directory that charges a lowest price for the endpoint data, or may elect to use a directory based on some other criteria.

In one example embodiment herein, the federated directory 200 has one or more pointers to the information stored in the individual industry directories 201, 202, 200 . . . N, and does not replicate information stored in those industry directories, given that the record of truth is deemed to be that held by the industry directories. The federated directory 200 therefore effectively holds a reference to the fact that data exists and the pricing associated with it, by virtue of one or more pointers. In other example embodiments herein, the federated directory 200 can replicate the information stored in the industry directories 201, 202, 200 . . . N, or, in another example, can query the industry directories for information, such as on an as-needed or transaction-by-transaction basis, although these examples are not exclusive. In still another example embodiment herein, the federated directory 200 stores the endpoint data, and that data may or may not also be stored in the industry directories 201, 202, 200 . . . N. The federated directory may tokenize the data, as described herein.

Although a single federated directory 200 is represented in FIGS. 1 and 2, it should be noted that in some example embodiments more than a single federated directory 200 may be employed. Also, in other example embodiments, separate federate directories 200 may be provided, such as a federated payor directory and a federated payee directory. For example, the payor federated directory can post or make available information regarding whether endpoint data for a particular payor exists in the proprietary database of the federated payor directory, and/or whether endpoint data for a particular payor exists in one or more directories 201 to 200 . . . N. The payor federated directory can also post or make available additional information related to pricing and other criteria for enabling access to the endpoint data. Similarly, the payee federated directory can post or make available information regarding whether endpoint data for a particular payee exists in the proprietary database of the federated payee directory, and/or whether endpoint data for a particular payee exists in one or more directories 201 to 200 . . . N. The payee federated directory can also post or make available additional information related to pricing and other criteria for enabling access to the endpoint data.

In one example aspect herein, the federated directory 200 can receive a request for party endpoint data from, for example, a FI 111 or 121, and can then determine whether the endpoint data is included in the directory 210, and/or can communicate with, or identify one or more pointers to, the other directories 200 to 200 . . . N to determine whether any of those other directories has the endpoint data. Then, in one example embodiment herein, the federated directory 200 can notify or otherwise make available to the requesting entity (e.g., FI 111 or 121) information indicating that the requested endpoint data is available (or unavailable), and, in the case where pricing and/or some other criteria is required for providing the information to the requesting party, the pricing and/or other criteria also can be provided.

It should be noted that pricing is not required in at least some embodiments. Whether pricing is employed depends on applicable operating criteria for the system 100. In some example embodiments where pricing is employed, a price can be charged on a transaction-by-transaction basis, although in other embodiments, participants in the system 100 may pay a periodic subscription fee (in addition to or in lieu of transaction-by-transaction fees) for participation in the service 100. The fee(s) may be provided to any applicable element of the system 100, including without limitation, the RTP system 130, the federated directory 200, the industry directories 201 to 200 . . . N, or other elements. In some embodiments, fees obtained by one component of the system, such as federated directory 200 or system 130, can be forwarded or shared with other components requiring payment for services, such as, without limitation, the industry directories 201 to 200 . . . N, and the fees can be paid from, e.g., FIs 111 and 121 (or other components of system 100). In some example embodiments where fees are charged on a transaction-by-transaction basis, the fees may be obtained as a mark-up on a transaction value, and can be obtained during transmission of a corresponding payment transaction through the system 100, although this example is not exclusive.

In an example embodiment herein, instead of, or in addition to, providing information related to pricing and/or other criteria for enabling access to the endpoint data, the federated directory 200 may request and/or receive a bid from a FI 121, 111 requesting external access to endpoint data relating to a particular party. In one example herein, the bid may be included in the request for endpoint data, although in another embodiment the bid can be provided after the FI is notified that endpoint data is included in one or more directories. The federated directory 200 can then provide the bid to the industry directories 201, 202, 200 . . . N that contain the requested endpoint data, and then the industry directories 201, 202, 200 . . . N can determine whether to accept or reject the bid, e.g., in an auction or other type of decision-making process. In other example embodiments herein, the federated directory 200 itself can make the determination, based on pricing, or some other predetermined rules or criteria, for the endpoint data by the directories 200, 201 to 200 . . . N.

In some example embodiments herein, the federated directory 200 can generate tokens, according to the Universal Payment Identification Code (UPIC) protocol, for a particular bank and routing numbers in response to a request from a FI 121, 111. In the same or other example embodiments herein, the federated directory 200 also can be connected to a secure token exchange (STE) 212 (and/or network 130) to create, or otherwise obtain from that entity, tokens according to the UPIC protocol. In this manner, BANPC and BRNPC identifiers for a payor associated with station 110 or a payee associated with station 120 can be obtained, either by accessing the federated directory 200 or by way of RTP network 130. In a tokenization procedure, the BANPC and BRNPC identifiers can be used by the RTP network 130 in place of an actual account number and routing number of a party, in messages such as request for payment messages (RFP), payment transaction messages, and the like. The BANPC and BRNPC identifiers for respective parties, such as payors and payees (including other entities), can be stored in the proprietary directory 210 of the federated directory 200, or can be obtained from the secure token exchange (STE) for enabling tokenization and detokenization procedures to be performed by the RTP network 130, or by the directory 200 itself The detokenization procedure includes a reversal of the tokenization procedure, and thus includes a translation of the BANPC and BRNPC identifiers included in a message, such as, e.g., a request for payment message (RFP) or a payment transaction message, back into bank account and routing numbers, respectively. For example, during the detokenization procedure, the BANPC and BRNPC identifiers are correlated to an account number and an associated routing number, respectively, stored in the proprietary directory 210 of the federated directory 200 or elsewhere. The account number and the associated routing number are then inserted (e.g., by the RTP network 130) into the message in place of the BANPC and BRNPC identifiers, which are removed so that the message can be sent to a destination for completing a transaction.

Before describing flow diagrams directed to methods according to example aspects herein, a brief description will first be provided regarding how the federated directory 200 is employed in various scenarios, such as a case where a request for payment (RFP) message is employed, and another case where a real time payment transaction is employed, according to example aspects herein.

For the (RFP) message case, a RFP message can be sent from a payee associated with station 120 to a payor associated with station 110, to request that the payor make payment of an amount to the payee. In this case, a payee FI 121 (e.g., in response to a request by payee station 120) first sends a request for endpoint data about a party (from whom the request is being made) to the RTP network 130. Information identifying the party (e.g., a payor associated with station 110 and payor FI 111), such as a name, street address, email address, phone number, or the like (associated with the payor, payor station 110, and/or payor FI 111), may be included in the request. The RTP network 130 validates the request, e.g., by checking its format and the like.

The requested endpoint data may exist in one or multiple directories, such as in the propriety database 210 of federated directory 200 itself and/or in any other directories 201, 202, 200 . . . N, and there may be pricing required for the endpoint data, which may vary for different directories. After validating the request, the federated directory 200 determines whether the endpoint data for the payor exists in one or more directories. By example, in one example embodiment herein, the federated directory 200 checks its database 210 to determine whether the requested endpoint data is included therein, and also communicates with the directories 201, 202, 200 . . . N to determine whether the requested endpoint data is included in any of those directories, and also whether there is any pricing or other requirements that would needed to be provided in order to obtain the endpoint data. In either situation, the determination can be made by comparing information included in the request for endpoint data, to information stored in the directories, to determine whether corresponding information, and related endpoint data, is included therein. In one example embodiment herein, the determination of whether endpoint data and/or pricing exists is made by simply correlating information included in the request for endpoint data, to one or more corresponding pointers of the directory 200, wherein the pointers point to corresponding information stored in the directory 210 and/or the industry directories 201 to 200 . . . N.

If it is determined that there is such information and endpoint data included, the federated directory 200 can respond to the request by providing a message to the payee F1 121, identifying the directory or directories where the endpoint data exists and the requirements (if any) for enabling access to the endpoint data. Thereafter, a decision can be made, such as by the payee, payee station 120, payee FI, 121, or even by the one or more of the directories 200, 201 to 200 . . . Nf, as to which directory to use to access the endpoint data. Such a decision can be made based on applicable criteria, such as, in one example embodiment herein, based on which directory requires the lowest price for the data, although other decision-making criteria also can be employed, such as, e.g., a predetermined priority order, a bid/auction process as described above, or other criteria. After the decision is made (and communicated by the deciding entity to the directory 200, if needed), the federated directory 200 then retrieves or obtains the requested endpoint data from the selected directory, wherein in a case where the endpoint data is obtained from one or more external directories 201 to 200 . . . N, the obtainment involves communicating with such directories to obtain the information, and wherein in a case where the database 210 includes the endpoint data, the data is obtained from there. (In one example embodiment herein, the federated directory 200 stores endpoint data obtained from external directories into the proprietary directory 210, if it is not stored there already, although in other examples the retrieved information need not be stored there). In one example embodiment herein, the federated directory 200 and/or RTP system 130 also correlates information in the retrieved/obtained endpoint data, such as, for example, a routing number of the payor FI 111 and/or a related account number associated with the payor FI 111, to a corresponding BRNPC identifier and BANPC identifier, obtained in the above-described manner from, for example, directory 210 or the STE, to thereby tokenize the numbers. The BANPC and BRNPC identifiers are then sent to the FI 121 from which the request for endpoint data was received, either directly by the directory 200 or by way of the RTP network 130, so that the FI 121 can then create a request for payment message (RFP) without using or having access to the actual payor account and routing numbers from the endpoint data.

The example case of a real time payment transaction will now be described, wherein a payor associated with station 110 can effect a payment to a payee associated with station 120, using the federated directory 200. In this case, a payor FI 111 first sends a request for endpoint data to the directory 200 (either directly or by way or RTP network 130), to request the endpoint data needed to route a payment transaction message to a particular payee, such as a payee associated with station 120. Information identifying the payee, such as a name, street address, phone number, email address, or the like, may be included in the request. The request is communicated to and validated by, e.g., the RTP network 130 and/or federated directory 200, and the federated directory 200 then determines whether the endpoint data for the payee FI 121 exists in the database 210 or one or more of the directories 201 to 200 . . . N, in the same manner as described above for the RFP message case. Again, the endpoint data may exist in multiple directories, in addition to or in lieu of database 210, and there may be pricing and/or other criteria required for the endpoint data that may vary between directories. The federated directory 200 then can respond to the request by providing a message to the payor F1 111, identifying the directory or directories where the endpoint data exists and the requirements (if any) for enabling access to the endpoint data.

Thereafter, a decision can be made, such as by the payor, payor station 110, payor FI, 111, or by one or more of the directories 200, 201 to 200 . . . N, as to which directory to use to access the endpoint data. Such a decision can be made based on applicable criteria, such as, in one example, based on which directory requires the lowest price for the data, although other decision-making criteria also can be employed such as, e.g., a predetermined priority order, a bid/auction process as described above, or other criteria. After the decision is made (and communicated by the deciding entity to the directory 200, if needed), the federated directory 200 then retrieves or obtains the requested endpoint data from the selected directory, wherein in a case where the endpoint data is obtained from one or more external directories 201 to 200 . . . N, the obtainment involves communicating with such directories to obtain the information (in one example, this is performing using one or more pointers), and wherein in a case where the database 210 includes the endpoint data, the data is retrieved from there. (In one example embodiment herein, the federated directory 200 stores endpoint data obtained from external directories into the proprietary directory 210, if it is not stored there already, although in other examples the retrieved information need not be stored there). The federated directory 200 and/or RTP system 130 also correlates information in the retrieved/obtained endpoint data, such as, for example, a routing number of the payee FI 121 and/or a related account number associated with the payee FI 121, to a corresponding BRNPC identifier and BANPC identifier, obtained in the above-described manner from, for example, directory 210 or the STE. The BANPC and BRNPC identifiers are then sent to the FI 111 from which the request for endpoint data was received, either directly or by way of the RTP network 130, so that the FI 111 can then create a payment transaction message without using or having access to the actual payor account and routing numbers from the endpoint data.

In view of the foregoing example embodiments, the federated directory 200 effectively provides a single interface or system for leveraging multiple industry directories to enable a party to send a request for payment (RFP) message or to effect a payment transaction using endpoint data obtained from one or more of those directories, by way of a single interface, namely, directory 200. The transaction system 100 and federated directory 200 described herein enable secured transactions to be made between a payor and payee such that, for example, the payee may securely send a request for payment message (RFP) to the payor, and the payor may make a secure payment to the payee (in real-time or otherwise). Accordingly, a customer (e.g., payor) can more efficiently and more securely pay various balances owed to various billers (e.g., payees) through a single secure location (directory 200) that leverages multiple directory services, to enhance a payment procedure, while also improving computer and networking technology by reducing the amounts of signal traffic, computer processing, and storage that would otherwise be required without the directory 200 to access/obtain information from the various industry directories 201 to 200 . . . N individually and separately, and/or to conduct financial transactions without the directory 200. Moreover, the leveraging of multiple external directories 201 to 200 . . . N, in addition to the information stored in the federated directory 200 itself, provides for, effectively, a more ubiquitous and all-encompassing directory service that includes more endpoint data than that included in any single existing directory service, thereby avoiding problems associated with fragmenting and the like, in traditional systems, and enabling transactions to be performed more easily and more reliably. Moreover, such leveraging provides additional business opportunities for third party directories, and also enables parties requesting endpoint data to have more directories and pricing options to be made available to them than were available traditionally.

It should be noted that although the example embodiments described herein are in the context of RTPs and payment transactions, the scope of the invention is not limited only thereto, and it also is within the scope of the present invention to employ the federated directory and the functionalities thereof in conjunction with other types of messages and transactions as well, and/or merely to obtain endpoint data associated with a particular party.

Example Computer Systems

Figure 3:
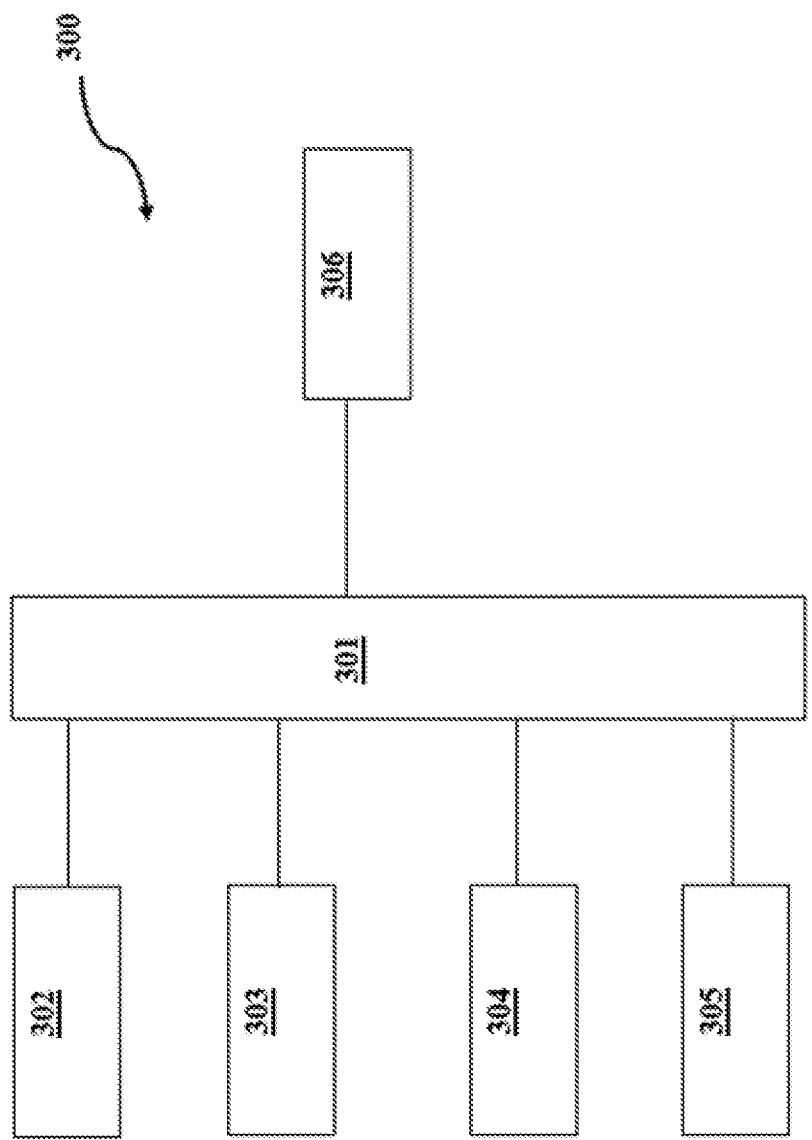
FIG. 3 is an example computer system configured in accordance with example embodiments herein.

Before describing flow diagrams of methods according to example aspects herein, an example computer system that can be employed herein will now be described. FIG. 3 is a diagram of an example computer system 300. In example embodiments, the computer system 300 may form at least part of one or more of the components illustrated in the Figures, and may be configured to perform one or more steps of the processes illustrated in the Figures. For example, a payor FI 111 and payee FI 121 can include one or more servers, each which can include one or more computer systems 300 like that of FIG. 3. As another example, a user station (e.g. stations 110 and/or 120) can include one or more computer systems 300. Also, the RTP network 130, the federated directory 200, and the directories 201 to 200 . . . N can include at least part of one or more computer systems 300 for carrying out the procedures described herein.

The system 300 of FIG. 3 includes a processor 302, a memory 303, a storage device 304, a communications device 305, and one or more user interfaces 306, all of which are coupled to a bus 301. The processor 302 can communicate with the other components of the computer system 300 through the bus 301. The storage device 304 includes one or more computer-readable media. The storage device 304 can be configured to read and write data including program instructions that may be executed by the processor 302 and operating systems (e.g., a general-purpose operating system, such as Microsoft Windows and UNIX, or a custom operating system) that allow the processor 302 to control the operation of the other components. The communications device 305 can be configured to enable the processor 302 to communicate with, for example, a network and the internet. The user interfaces 306 can include input devices (e.g., keyboards, mice, joysticks, trackpads, stylus tablets, microphones, and cameras), output devices (e.g., video displays, printers, and speakers), and input/output devices (e.g., touch screens). The user interfaces 306 can form at least part of any of device, component, and/or system discussed herein.

Processor 302 is configured to perform part (or all) of any of the processes described herein, depending on which component(s) of FIG. 1 the computer system 300 forms a part of. For example, processes such as all or part of those in the flow diagrams described herein can be stored on storage device 304 in the form of computer-readable program instructions. To execute a process, the processor loads the appropriate instructions, as stored on storage device 304, into memory 303, and then executes the loaded instructions to perform electronic transaction services, such as to, for example, generate a request for payment message (RFP), a payment transaction message for processing a payment, or other type of message, and/or to determine whether requested endpoint data is included in a directory and to provide and select or enable selection of such data as described herein.

Example Transaction Methods

1. Procedures Performed by the Federated Directory

1A. Tokenization

An example of a tokenization procedure performed by the federated directory 200, according to an example aspect herein, will now be described with reference to the flow diagram illustrated in FIG. 2A. In this case, the federated directory receives a request for endpoint data relating to a targeted party from a requesting party (e.g., a payor, payee station 110, 120, FI 111, 121) (step 240). As described above, the endpoint data may include an account number and routing number of the targeted party, and the request for endpoint data may include information identifying the targeted party, such as a name, street address, phone number, or the like. In one example, the federated directory 200 receives the request for endpoint data directly, and in another example, the request for endpoint data is received by way of the RTP network 130.

The federated directory 200 then validates the request (i.e., by checking the request's format and the like) (step 242), and determines whether the endpoint data for the party exists in one or more directories (step 244). With respect to validation, the federated directory 200 may validate various different types of messages, as disclosed elsewhere herein. In one example, the endpoint data may exist in one or in multiple directories, including for example the propriety database 210 of federated directory 200 itself and/or any other directory 201, 202, 200 . . . N. The federated directory 200 then generates a message which identifies the directories where the endpoint data exists, and which may also include pricing information and/or other criteria for enabling access to each directory where the endpoint data exists (step 246). In one example herein, the message is sent from the federated directory 200 to the RTP network 130 which then forwards the message to the requesting party (e.g., a payor, payee station 110, 120, FI 111, 121) (step 248'). In another example, the message is sent directly from the federated directory 200 to the requesting party (step 248).

Thereafter, the federated directory 200 receives a selection from the requesting party (step 250). The federated directory 200 then retrieves the endpoint data (e.g., account and routing numbers associated with the target party) from the selected directory (step 252), and stores the endpoint data in the proprietary directory 210 (step 254). The federated directory 200 then obtains a BANPC identifier that masks the account number of the targeted party and a BRNPC identifier that masks the routing number of the targeted party (step 256) in the above-described manner, and stores the BANPC and BRNPC identifiers in the proprietary directory 210 (step 258). The federated directory may then send the BANPC and BRNPC identifiers to the requesting party by way of the RTP network 130, in one example, or may send the BANPC and BRNPC identifiers directly to the requesting party (step 260) so that a transaction message can be created by or for the requesting party without using the actual account and routing numbers. Thereafter, the tokenization procedure ends (step 262).

1B. Detokenization

An example of a detokenization procedure performed by the federated directory 200, according to an example aspect herein, will now be described with reference to the flow diagram illustrated in FIG. 2B. In this case, the federated directory 200 first receives a message from the RTP network 130 that contains tokens such as the BANPC and BRNPC identifiers described above (step 270). The message can be any type of message, such as, e.g., a request for payment message (RFP) or a payment transaction message, or another type of message. The federated directory 200 then validates the message, and searches, in one example embodiment, the proprietary directory 210 for the BANPC and BRNPC identifiers that are included in the message so that the BANPC and BRNPC identifiers are correlated to an account number and a routing number, respectively, stored in the proprietary directory 210 (step 274). In other example embodiments, the federated directory 200 may search other (e.g., industry) third party directories 201, 202, 200 . . . N for the BANPC and BRNPC identifiers that correlated to the same identifiers that are included in the message so that the BANPC and BRNPC identifiers are matched to an account number and a routing number, respectively, stored in the other (e.g., industry) third party directories 201, 202, 200 . . . N. With respect to validation, the federated directory may validate various different types of messages, as disclosed elsewhere herein. The account and routing numbers are then sent to the RTP network 130 (step 274) so that the RTP network 130 can insert them into the message in place of the BANPC and BRNPC identifiers, which are removed. In another example embodiment, the federated directory 200 inserts the account number and routing numbers into the message, and removes the BANPC and BRNPC identifiers from the message (step 274'). Thereafter, the detokenization procedure ends (step 276), and the message is then further processed by the RTP network 130 as will be described further below with reference to the flow diagrams illustrated in FIGS. 4 and 5.

Figure 2A:
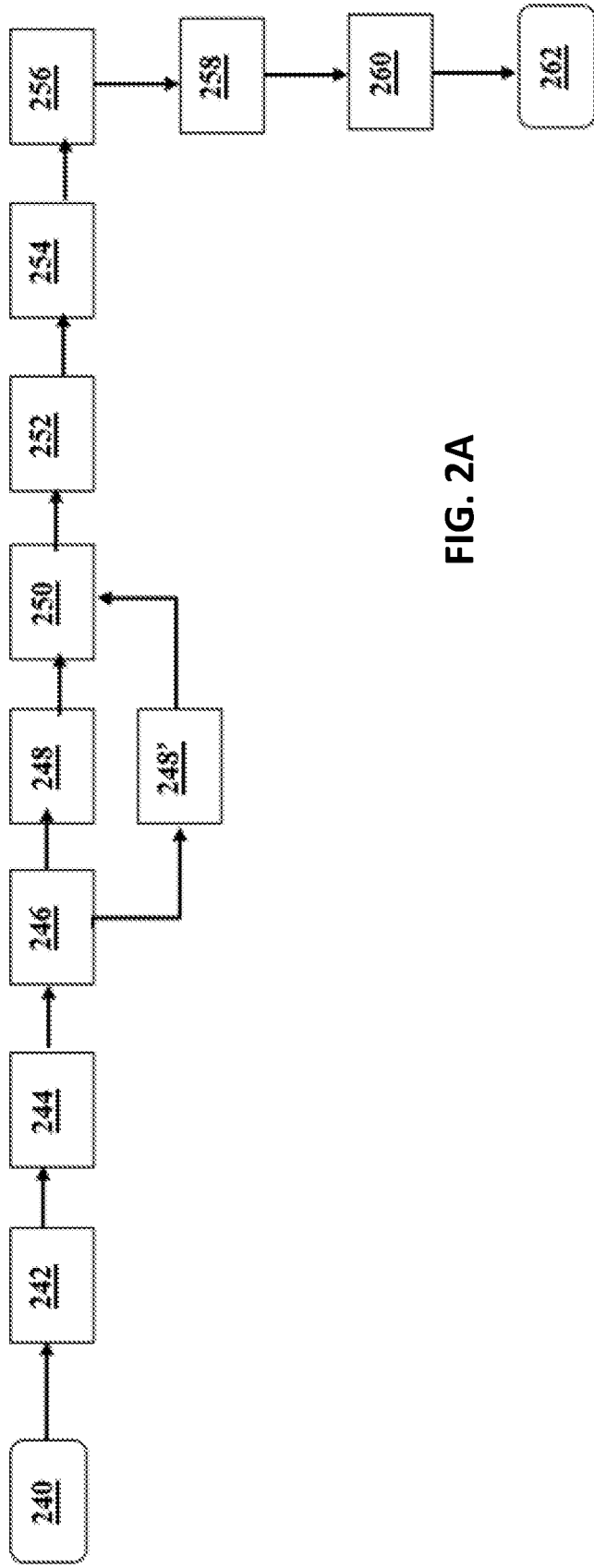
FIG. 2A illustrates an example procedure by a federated directory when a request for payment (RFP) message is sent from a payee to a payor.
Figure 2B:
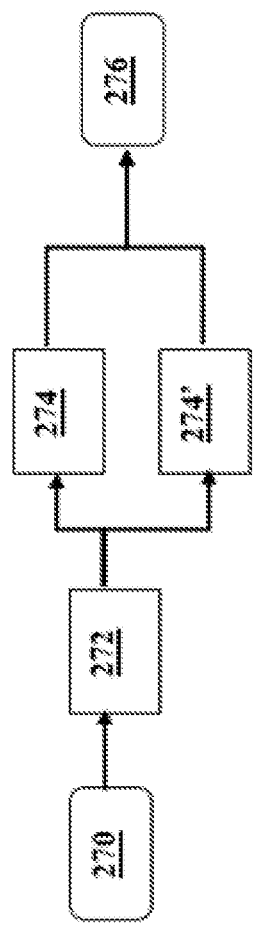
FIG. 2B illustrates an example procedure of a federated directory when a payment transaction message is sent from a payor to a payee.

In other example embodiments herein, other components besides the federated directory 200 can perform the steps described above as being performed by the directory 200 in FIGS. 2A and 2B, such as, without limitation, the RTP system 130, a federated payor directory and/or a federated payee directory, and/or other component(s) of system 100.

2. Request for Payment Procedure

Figure 4:
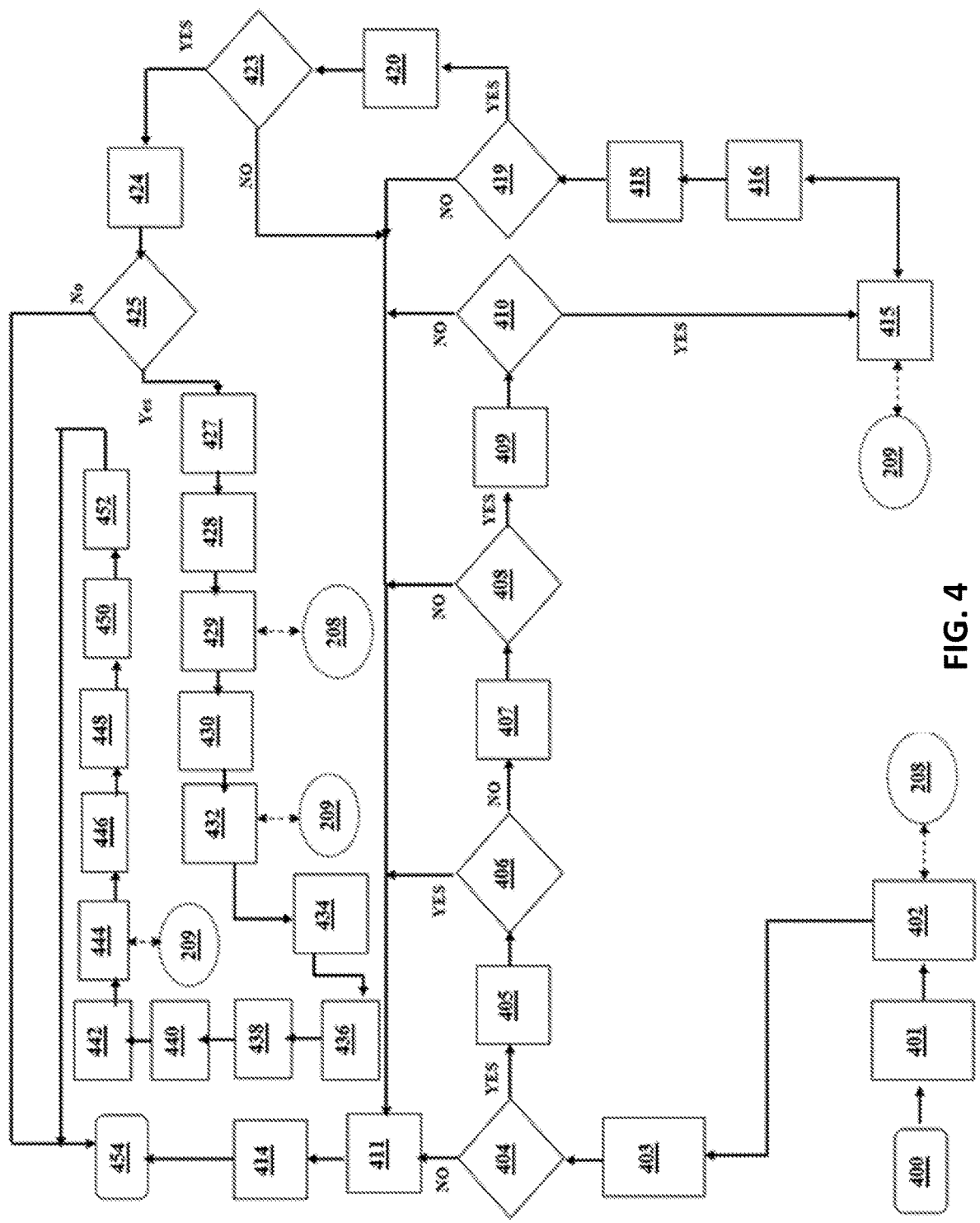
FIG. 4 illustrates a flow diagram of a process for a request for payment, according to an example embodiment herein.

A request for payment method according to an example aspect herein will now be described in greater detail, with reference to FIG. 4, which illustrates a flow diagram according to an example embodiment herein. In one example embodiment, a payee (e.g., a payee associated with station 120 in FIG. 1) can provide a request for payment (RFP) to a payor (e.g., a payor associated with station 110 in FIG. 1) such that the payor can obtain access to and view, summary and detailed bills through payor FI 111 (e.g., via an on-line banking website or mobile application).

In step 400, the payee station 120 sends a request to the payee FI 121, requesting that payment be made to a payee associated with the station 120, from another party, such as a payor associated with payor station 110. The payee FI 121 then responds by sending a request for endpoint data (as described above) relating to the payor towards the federated directory 200 (either directly or by way of the RTP network 130) (step 401), where the request is then employed to obtain BANPC and BRNPC identifiers (based on information included in the request), in the tokenization procedure described above in accordance with the flow diagram represented in FIG. 2A. For example, as described above, the federated directory 200 determines whether the requested endpoint data is included in the database 210 and/or the other directories 201 to 200 . . . N, determines which database 210 or directory 201 to 200 . . . N to retrieve the endpoint data from (e.g., either on its own or by presenting options to the requesting party and obtaining a responsive selection), and obtains corresponding BANPC and BRNPC identifiers, in the above-described manner.

The obtained BANPC and BRNPC identifiers are then provided by the directory 200 (either directly or by way of RTP network 130) to the payee FI 121 (step 208) so that the payee FI 121 can include the BANPC and BRNPC identifiers in a request for payment message (RFP) that is generated by the FI 121 and provided to the RTP Network 130 (step 402). The request for payment message (RFP) may include, in addition to the BANPC and BRNPC identifiers, for example, a transaction identifier (e.g., a UT-ID generated by an algorithm), a payee's name (and/or other applicable information), the payor's name, the payment amount, and a payee remittance identifier (i.e., payor's account number with the payee) so that the payee can associate the payment with the payor, and/or additional information for posting purposes, although in some embodiments not all of that information need be included. In one example embodiment herein, the RFP message includes a bill summary having a limited amount of information to notify a payor that a payment should be made to the payee. The bill summary also can include information such as a link which is selectable for enabling access to a detailed bill, in the below described manner.

Next, the RTP network 130 receives the request for payment message (RFP) from the payee FI 121 and determines whether the request for payment message (RFP) is correctly formatted (step 403). For example, the RTP network 130 checks the message type, and validates the format, syntax, and/or structure of the message. Step 403 can be performed in accordance with any suitable technique. If it is determined that the message is not properly formatted ("No" in step 404), then control passes to step 411 which will be described below. If it is determined that the message is properly formatted ("Yes" in step 404), then control passes to step 405 where the RTP network 130 checks to determine whether the RFP message is duplicative of one already received, based on, for example, whether a UT-ID included in the message was already received in a previous message. If it is determined that the message is duplicative ("Yes" in step 406), then control passes to step 411, which will be described below. If the message is determined to not be duplicative ("No" in step 406), then control passes to step 407 where the RTP network 130 checks the RFP message to determine whether it includes valid BANPC and BRNPC identifiers. If not ("No" in step 408), then control passes to step 411 which is performed in a manner to be described below. If "Yes" in step 408, then the RTP network 130 makes a determination as to whether the payee FI 121 is enabled for sending a request for payment message (RFP), and whether the payor FI 111 is enabled for sending payment transactions (step 409). For example, step 409 can include RTP network 130 checking a look-up table to determine whether information in the table indicates that FIs 111, 121 have such respective capabilities. If the FIs are determined not to be enabled (No" in step 410), then control passes to step 411.

If the FIs are determined to be enabled ("Yes" in step 410), the request for payment message (RFP) is detokenized by the federated directory using the detokenization procedure described above in accordance with the flow diagram represented in FIG. 2B (step 209). For example, the BANPC and BRNPC identifiers in the request for payment message (RFP) are translated by the federated directory 200 by matching these pseudo-code identifiers with a corresponding account number and routing number stored in the proprietary directory 210 of the federated directory 200. The corresponding account number and routing number, which are associated with the payor associated with station 110, are then inserted by the RTP network 130 into the request for payment message (RFP), and the BANPC and BRNPC identifiers are removed from the message (step 415). The RTP network 130 then routes the request for payment message (RFP) with the newly inserted numbers to the payor FI 111 based on the inserted routing number (step 416).

Figure 6:
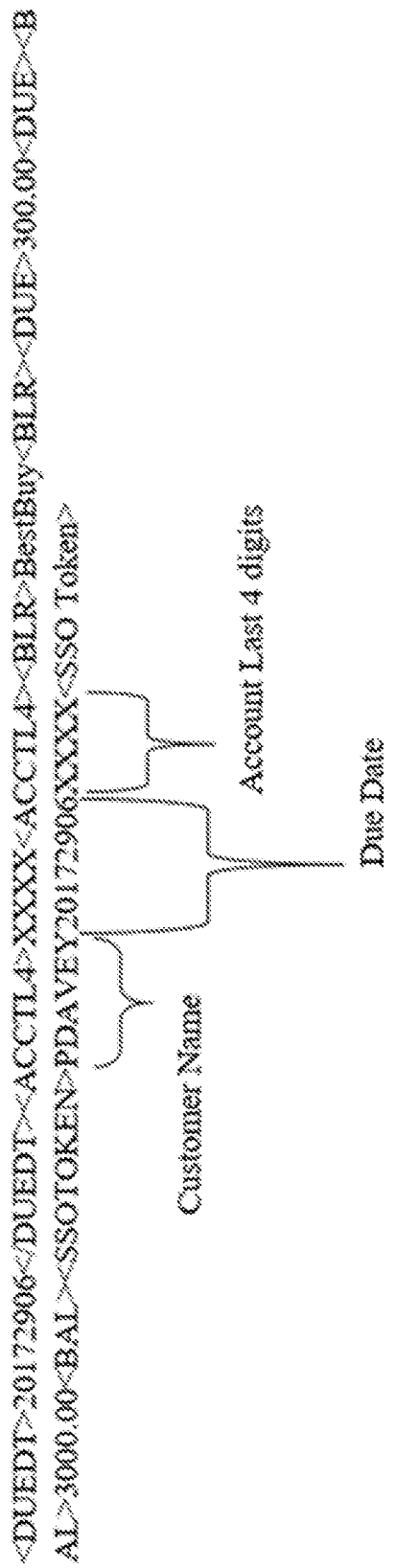
FIG. 6 illustrates an example format of a request for payment message (RFP).

The request for payment message (RFP) is then validated to confirm that it is in the correct format (step 418). An example of a RFP format is illustrated in FIG. 6. In the case where the validation is not successful ("No" in step 419), then control passes to step 411. In the case where the validation performed in step 419 is successful ("Yes" in step 419), the RTP network 130 then receives a determination of whether the payor FI 111 associated with the payor station 110 (or the station itself 110) accepts the request for payment message (RFP) (step 420). If not ("No" in step 423), then control passes to step 411 which is performed in the below described manner.

Referring now to step 411, that step includes the RTP network 130 generating an exception message and providing it to the payee FI 121 (in one example embodiment herein, the message is created by the payor FI 111 and sent to the RTP network 130 for being sent to the FI 121). Then, the payee FI 121 receives that message and notifies the payee station 120 of the message (step 414), and then the method ends (step 445).

If step 420 results in a determination of "Yes" ("Yes" in step 423), then control passes to step 424 where the payor FI 111 forwards the request for payment message (RFP) to the payor station 110. In one example embodiment, an "accept" message is sent to the payee FI 121 to indicate that the request for payment message (RFP) was successfully sent to the payor station 110. Next, a decision can be made (for example, by the payor) to accept or reject/ignore the request for payment message (RFP) (step 425). If it is decided to reject/ignore the message ("No" in step 425), the method ends in step 445.

On the other hand, if the RFP message is accepted ("Yes" in step 425), then the payor associated with station 110 may, in one example embodiment, request that a detailed bill be provided, such as to the payor FI 111 (step 427). For example, in one embodiment where the RFP message includes a bill summary having a link for accessing a detailed bill, the link can be selected to request the detailed bill. Also in one example embodiment herein, the payor can view the bill summary and select the detailed bill via an online banking interface provided by payor FI 111, although in other examples these procedures can be performed without using the online interface. Additionally, in one example embodiment herein, the selection to view the detailed bill can implement a SSO procedure, as described above, to communicate with a source of the bill and obtain the bill.

In response to receiving a request to view a detailed bill, the payor FI 111 responds to the request for a detailed bill by sending a request for endpoint data relating to the payee associated with station 120, towards the federated directory 200 (either directly or by way of RTP network 130) (step 428), where the request is then employed to obtain BANPC and BRNPC identifiers (based on information included in the request), in the above-described manner (step 208). For example, as described above, the federated directory 200 determines whether the requested endpoint data is included in the database 210 and/or the other directories 201 to 200 . . . N, determines which database 210 or directory 201 to 200 . . . N to retrieve the endpoint data from (e.g., either on its own or by presenting options to the requesting party and obtaining a responsive selection), and obtains corresponding BANPC and BRNPC identifiers, in the above-described manner.

The obtained BANPC and BRNPC identifiers are then provided by the directory 200 (either directly or by way of RTP network 130) to the payor FI 111 (step 429). The payor FI 111 then generates a bill request message that includes the BANPC and BRNPC identifiers relating to the payee and provides the bill request message to the RTP Network 130 (step 430). Next, the bill request message is detokenized by the RTP network 130 using the detokenization procedure described above (step 209), such that the BANPC and BRNPC identifiers in the bill request message are correlated to and replaced in the message with a corresponding account number and routing number associated with the payee associated with station 120 (step 432). In one example embodiment herein, the detokenization procedure can be performed in accordance with the flow diagram represented in FIG. 2B. The RTP network 130 then routes the bill request message to the payee FI 121 based on at least the routing number, in one example embodiment herein (step 434).

In one example embodiment herein, the payee FI 121 then forwards the bill request message to the station 120, or to biller interface 144 (by way of element 142 or directly) (step 436), where a detailed bill is requested (step 438).

Next, in step 440 a detailed bill is obtained from the station 120 or biller interface 144, wherein the detailed bill includes information such as, for example, an amount owed by the payor associated with station 110 to the payee associated with station 120, a due date, services or goods sold, and other bill details or the like, although this example is not limiting or exhaustive. In the case where the biller interface 144 obtains the requested bill, the biller interface 144 obtains the bill either by generating it on its own, or by communicating with a bill store, such as one maintained by the payee or payee station 120, to obtain the bill or information for generating the bill. In an example embodiment where the biller interface 144 is employed to obtain the bill, the bill request message need not first be provided to the payee FI 121, and instead may be provided to the biller interface 144, which then can obtain the requested bill in the above manner. In still a further example embodiment herein, the detailed bill is obtained by the payee FI 121 in response to receiving the bill request message, wherein the FI 121 obtains the bill either by generating it on its own, or by communicating with the bill store or the billing interface 144 to obtain the bill or information for generating the bill.

Next, in step 442 a message including the obtained detailed bill is forwarded through the system 100 towards the requesting entity, by way of the RTP network 130 or the federated directory 200 by way of the RTP network 130. In one example embodiment herein, in addition to the detailed bill, the message also includes BANPC and BRNPC identifiers associated with the payor. Those identifiers may have been obtained previously, such by the FI 121, during the RFP message procedure described above, and can be used again in the message forwarded in step 442. In another example embodiment herein, the BANPC and BRNPC identifiers can be newly obtained again, for use in the message forwarded in step 442, by using the same procedure as that described above to obtain them in the RFP message procedure, in response to the FI 121 requesting the directory 200 (directly or by way of network 130) to provide endpoint data relating to the payor associated with station 110.

Next, a detokenization procedure is performed as described above by the RTP network and/or directory 200 (step 209), to obtain an account number and routing number associated with the payor associated with station 110, based on the BANPC and BRNPC identifiers included in the message, and the identifiers are replaced in the message with those numbers. In one example embodiment herein, the detokenization procedure can be performed in accordance with the flow diagram represented in FIG. 2B. A message including those numbers and the detailed bill is then routed to the payor FI 111 based on at least the routing number (step 444). The payor FI 111 can then forward the detailed bill to the payor station 110, where it can be accessed and viewed by the payor (step 446).

Upon receiving the detailed bill, the payor associated with payor station 110 may decide to make a payment for settling the detailed bill (step 448). If so, the payor station 110 can provide a message to the payor FI 111 requesting that a payment be made (step 450). The payor FI 111 then adds to a payment transaction message an indication that the payment transaction message is in response to a particular request for payment message (RFP) (step 452) (e.g., the indication is added to the UT-ID). Afterwards, the method ends (step 454) and a real-time payment process described below (FIG. 5) can begin for making a real-time payment.

3. Real-Time Payment Procedure

Figure 5:
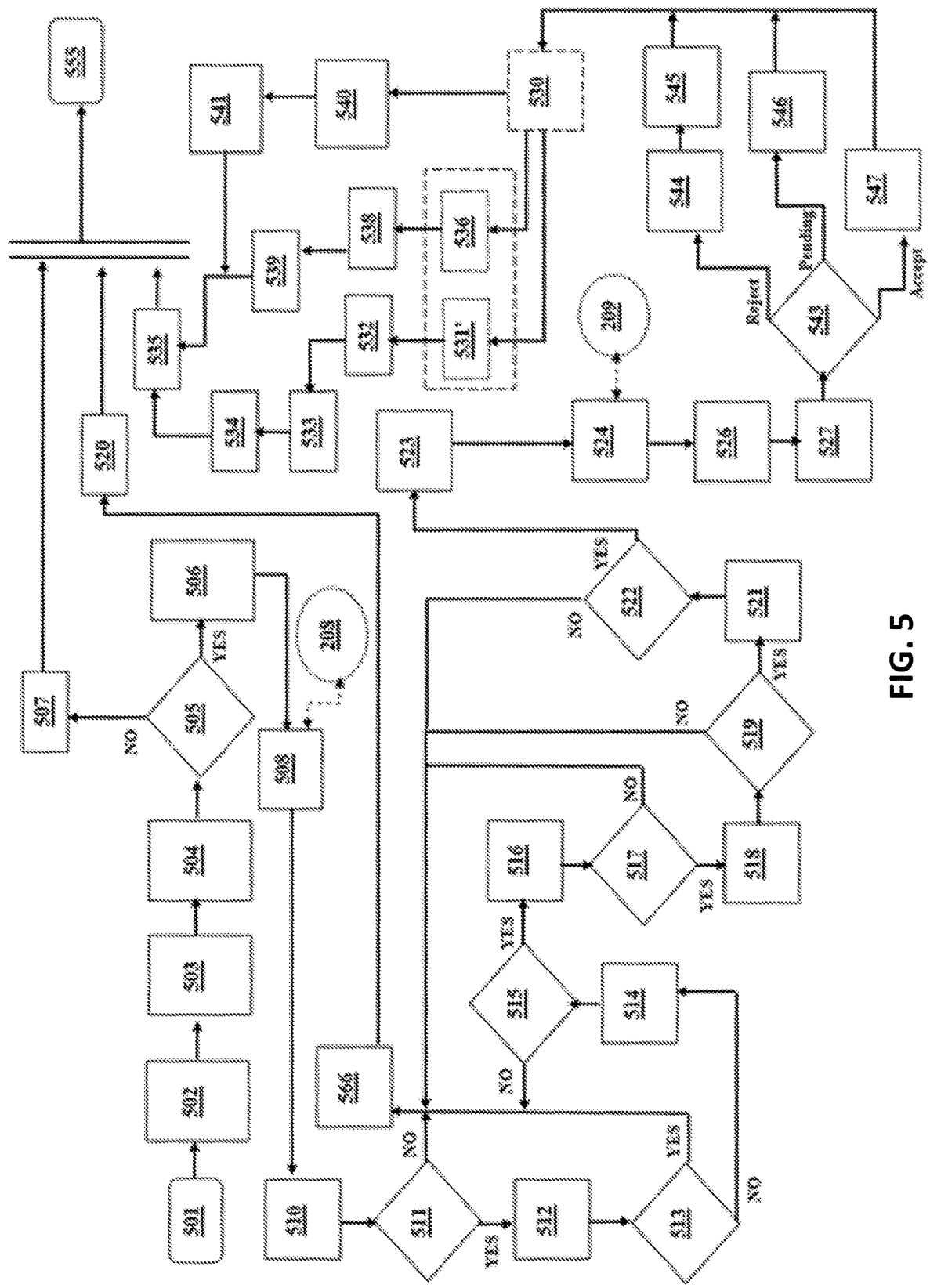
FIG. 5 illustrates a flow diagram of a process for a real time payment, according to an example embodiment herein.

A real-time payment procedure according to an example embodiment herein will now be described. Referring now to FIG. 5, in addition to being able to obtain access to and view, summary and detailed bills, a payor (e.g., associated with station 110) can connect to a payor FI 111 (e.g., via an on-line banking website or mobile application) to authorize a payment of an amount from the payor's account with payor FI 111 to a payee associated with station 120 and FI 121 (step 501). It is noted that payment can be made in response to a request for payment message (RFP), although it need not be.

After receiving payment authorization (e.g., a payment authorization message) from the payor (step 502), such as, for example, via a channel specific message, the FI 111 checks the account associated with the payor to determine whether the account has a sufficient amount of funds available to cover the payment amount (step 503), in one example embodiment herein.

Where sufficient funds are determined to be available, the payor FI 111 then determines whether the requested payment can be processed in real time (step 504). In one embodiment, step 504 is performed by the FI 111 determining at least one of (i) whether the payee FI 121 identified in the payment authorization has a capability to receive real time payments (i.e., is "real time enabled"), (ii) determining whether the payment amount is less than a predetermined individual transaction limit of the transaction system 100, and (iii) determining whether the payment amount is less than a predetermined client specific transaction value set by the FI 111 or 121. For example, determination (i) can involve the FI 111 associating an identifier of the payee FI 121 included in the payment authorization with associated predetermined information stored in the payor FI 111 indicating whether or not the payee FI 121 supports real time payment capability. In another example embodiment, the RTP network 130 stores the predetermined information, and the determination is made by the payor FI 111 communicating with the RTP network 130 to determine whether the predetermined information indicates that the payee FI 121 supports real time payment capability. In still another example embodiment, the predetermined information is stored elsewhere, in another element, of the transaction system 100, such as in the payee FI 121, and the determination is made by the payor FI 111 communicating with that element to determine whether the predetermined information indicates that the payee FI 121 supports real time payment capability. The determinations (ii) and (iii) can involve similar procedures for determining whether the payment amount is less than a predetermined transaction limit, i.e., the amount included in the payment authorization is checked against a limit that may be included in the FI 111 or 121, the RTP network 130, or in another element of the transaction system 100.

If any of the determinations (i), (ii), and (iii) results in a "No" ("No" in step 505), control passes to step 507 where the user of station 110 may elect to make the payment via another payment alternative, or the payor FI may not offer another payment alternative, or the user does not select another payment alternative. After step 507, the method ends (step 555).

If each of the determinations (i), (ii), and (iii) results in a "Yes" ("Yes" in step 505), the payor FI 111 sends a request for endpoint data relating to the payee towards the federated directory 200 (either directly or by way of the RTP network 130) (step 506), where the request is then employed to obtain BANPC and BRNPC identifiers associated with the payee (based on information included in the request), in the above-described manner (step 208). For example, as described above, the federated directory 200 determines whether the requested endpoint data is included in the database 210 and/or the other directories 201 to 200 . . . N, determines which database 210 or directory 201 to 200 . . . N to retrieve the endpoint data from (e.g., either on its own or by presenting options to the requesting party and obtaining a responsive selection), and obtains corresponding BANPC and BRNPC identifiers, in the above-described manner.

The obtained BANPC and BRNPC identifiers are then provided to the payor FI 111 so that the payor FI 111 can then include the BANPC and BRNPC identifiers in a payment transaction message that the FI 111 generates and provides to the RTP network 130 (step 508). The payment transaction message may include, in addition to the BANPC and BRNPC identifiers, a transaction identifier (e.g., a UT-ID generated by an algorithm), a payee's name (and/or other applicable information), the payor's name, the payment amount, and a payee remittance identifier (i.e., payor's account number with the payee) so that the payee can associate the payment with the payor, and/or additional information for posting purposes, although not all of that info necessarily need be included.

The RTP network 130 then receives the payment transaction message from the payor FI 111 and determines whether the message is correctly formatted (step 510). For example, the RTP network 130 can check the message type of the transaction, and validate the format, syntax, and/or structure of the message. This step can be performed in accordance with any suitable techniques. If it is determined that the message is not properly formatted ("No" in step 511), control passes to step 566 described below.

If it is determined that the message is properly formatted ("Yes" in step 511), then control passes to step 512 where the RTP network 130 checks to determine whether the message is duplicative of one already received, based on, for example, whether a UT-ID included in the message was already received. If it is determined that the message is duplicative ("Yes" in step 513), then control passes to step 566, which will be described below. If, on the other hand, the message is determined to not be duplicative ("No" in step 513), then control passes to step 514 where the RTP network 130 checks the message to determine whether it includes valid BANPC and BRNPC identifiers. If not ("No" in step 515), then control passes to step 566 which is performed in a manner to be described below. If "Yes" in step 515, then in step 516 the RTP network 130 makes a determination as to whether the payor FI 111 is enabled for sending payment transactions, and whether the payee FI 121 is enabled to receive payment transactions. For example, this step can include the RTP network 130 checking a look-up table to determine whether information in the table indicates that those FIs have such respective capabilities. If the FIs are determined not to be enabled (No" in step 517), then control passes to step 566 which will be described below. If, on the other hand, the FIs are determined to be enabled ("Yes" in step 517), then the RTP network 130 makes a determination as to whether the payor FI 111 or payee FI 121 have been suspended to participate in electronic payment transactions (step 518). If either of those FIs are determined to be suspended (and thus the check is determined not to be successful ("No" in step 519)), then control passes to step 566. If, on the other hand, neither of the FIs 111, 121 are determined to be suspended (and thus the check is determined to be successful ("Yes" in step 519)), then control passes to step 521 where the RTP network 130 performs various business validations. As an example, the validations can include determining whether the payment amount of the payment transaction is less than a predetermined individual transaction limit of the transaction system 100. In one example embodiment herein, step 521 can include one or more of the determinations (i), (ii), and (iii) described above. If the validation(s) performed in step 521 are determined not to be successful ("No" in step 522), then control passes to step 566.

In step 566, the RTP network 130 generates an exception message and forwards it to the payor FI 111. Then, in step 520 the payor FI 111 responds by processing the exception, where after the method then ends in step 555.

If the validation(s) performed in step 521 are determined to be successful ("Yes" in step 522), then control passes to step 523 where, in one example, the RTP network 130 updates at least one settlement position. In one example embodiment herein, the RTP network 130 updates a multilateral net settlement position for at least one of the payor FI 111 and the payee FI 121. In another example embodiment herein, the RTP network 130 updates the payor FI 111's position (i.e. by deducting the amount of credit transfer from the payor FI's available balance/position).

The payment transaction message is then detokenized using the detokenization procedure (209) described above, to obtain an account number and routing number, based on the BANPC and BRNPC identifiers included in the message, and the identifiers are replaced in the message with those numbers (step 524). In one example embodiment herein, this procedure can be performed in accordance with the flow diagram represented in FIG. 2B.

The payment transaction including those numbers is then routed to the payee FI 121 based on at least the routing number (step 526). Afterwards, the payee FI 121 begins processing the payment transaction (step 527) and determines whether to accept or reject the payment (step 543).

In the case where the payment is rejected (e.g., perhaps a relevant account is closed, a token is not recognized, etc.), the FI 121 assigns a reason for rejecting the payment (step 544) and then sends a status "RJCT" message to the RTP network 130 in step 545. Control then passes to step 530 which performs a tokenizing procedure (although in other embodiments it is not performed), and then control passes to step 531' which will be described below.

In the case where the FI 121 determines that the payment is pending in step 543 (e.g., perhaps owing to an anti-fraud, AML, or OFAC investigation, etc.), the FI 121 sends a status "PDNG" message to the RTP network 130 (step 546). The pending status message may also be, in one embodiment, an accepted without posting message. Control then passes to step 530 which performs a tokenizing procedure (although in other embodiments it is not performed), and control then passes to step 536 which will be described below. In the case where the FI 121 determines that the payment is accepted in step 543, then in step 547 the FI 121 sends a status "ACK" message to the RTP network 130. Control then passes to step 530 which performs a tokenizing procedure (although in other embodiments it is not performed), and control then passes to step 540. In one example embodiment, the FI 121 can notify the station 120 of the status of the payment (e.g., via text message, email, an online message or other form of communication).

In step 531' the RTP network 130 validates the payment transaction message with reason for rejection to determine that it is in a correct format. Then, in step 532, the RTP network 130 conducts a reversal of the update to the multilateral net settlement position of the payor FI 111 and/or payee FI 121 (i.e., a reversal of step 523), and then in step 533 the RTP network 130 updates the status of the payment transaction to indicate that the payment has been rejected. However, in another example embodiment herein, in response to receiving a rejection message from step 530, the position of the payee FI 121 is not altered, and the position of the payor FI 111 is reversed/credited by the applicable rejected payment amount, and there is no multilateral netting. In step 534, the RTP network 130 sends a payment reject message to the payor FI 111, indicating that the payment was rejected (which may include the reason for the rejection), and control then passes to step 535 where the FI 111 sends a message (e.g., a text message, email, online message or other form of communication) to the user station 110 indicating that the payment was rejected. Then, the method then terminates (step 555).

In step 536, the RTP network 130 validates the message from step 546 to determine that it is in a correct format. Then, in step 538, the RTP network 130 updates the status of the payment transaction as successful (in the case of step 547) or pending (in the case of step 546). In step 539 the RTP network 130 sends a payment status message to the payor FI 111, indicating that the payment was successful or pending, and control then passes to step 535 where the FI 111 sends a message (e.g., a text message, email, online message or other form of communication) to the user station 110 indicating that the payment was successful or pending. Then the method ends at step 555.

In step 540 the RTP network 130 determines whether a payment acknowledgement (e.g., an ACK message) received by the RTP network 130 from the payee FI 121 is correctly formatted. For example, the RTP network 130 checks the message type of the transaction, and validates the format, syntax, and/or structure of the ACK message. That step can be performed in accordance with any suitable techniques. Then, in step 541 the RTP network 130 forwards the ACK message to the payor FI 111, which then responds in step 535 by providing a message to the station 110 indicating that the payee FI 121 has acknowledged receipt of the payment. The method then ends in step 555. According to one example embodiment herein, payment acknowledgement is a separate transaction from a payment and response, and includes an end user (e.g., 110 or 120) acknowledgement that the payment was received and/or applied.

Additional Features and Considerations

The transaction system 100 and methods described herein are adaptable to meet the changing needs associated with market expectations and risk environments that are prone to change over time. The system 100 supports robust, flexible data models and message types and has an architecture that supports modular service integration. In one example embodiment herein, the system has global compatibility, and, consistent with domestic U.S. requirements, the system adheres to widely used global standards (e.g., ISO 20022) and the processes/conventions used by real-time payment systems in other countries to facility future interoperability, and to ease the implementation burden for multi-national banks and companies.

As described above, the transaction system 100 herein, in one example embodiment, employs "Credit Push" payments where customers can send payments directly from their existing accounts, providing greater customer engagement and transparency than alternative payment services. The transaction system 100 also, in one example, employs standard but extensible message formats, and supports independent product development by financial institutions through powerful, flexible standards while ensuring that the overall end-to-end process is consistent and reliable. Real-time messaging also is provided with "bank-grade" security, in that is provided financial institutions with tools to create a superior customer experience in applications such as mobile banking, P2P transfers, bill payments, just-in-time B2B transactions, etc. The transaction system 100 also uses integrated tokenization and directory services to eliminate need for customers to share sensitive account information or know routing details of recipients. The transaction system 100 thus is fundamentally safer, more-convenient, and more-capable than existing payment systems.

It should be noted that, although described herein in the context of translating bank account and bank routing numbers to BANPC and BRNPC numbers, respectively, and translating vice versa, the scope of the invention is not limited thereto. For example, in other embodiments no such translations need be employed, and the federated directory 200 can be communicated with to obtain (from one or more of directory 200 and directories 201 to 200 . . . N) requested endpoint data that is used to forward a message (e.g., a request for payment, a payment transaction, or other message) to a party or entity associated with the endpoint data. Also, the scope of the invention is not limited for use with only request for payment and payment messages, and the functionalities described herein also can be used in conjunction with any other types of messages as well.

In the foregoing description, example aspects are described with reference to several example embodiments. Accordingly, the specification should be regarded as illustrative, rather than restrictive. Similarly, the figures illustrated in the drawings highlight the functionality and advantages of the example embodiments, and are presented for example purposes only. The architecture of the example embodiments is sufficiently flexible and configurable, such that it may be utilized (and navigated) in ways other than those shown in the accompanying figures.

Software embodiments may be provided as a sequence of instructions, or software, which may be stored on an article of manufacture, e.g., a computer-readable medium having instructions. The instructions on the computer-readable medium may be used to program a computer system or other electronic device. The computer-readable medium may include, but is not limited to, floppy diskettes, optical disks, CD-ROMs, and magneto-optical disks or other types of media suitable for storing electronic instructions, and does not include non-transitory media such as signals and the like. The techniques described herein, when performed using a computer system, are not limited to any particular software configuration. They may find applicability in any computing or processing environment. The terms "computer-readable medium" and "memory" refer to any medium that is capable of storing, encoding, or transmitting a sequence of instructions for execution by a computer system and that causes the computer system to perform any technique described herein, and does not include non-transitory media such as signals and the like.

Furthermore, it is common in the art to speak of software, in one form or another (e.g., program, procedure, process, application, logic, and so on) as taking an action or causing a result. Such expressions are merely a shorthand way of stating that the execution of the software by a computer system causes the processor to perform an action to produce a result. In other embodiments, functions performed by software can instead be performed by hardcoded modules, and thus the example embodiments herein are not limited only for use with stored software programs. In addition, it is not necessary that processes described herein be performed with a computer system, and instead they can be performed, in whole or in part, by a human operator. It should be noted that the scope of the invention is not limited for use in a particular environment, rather the invention can be used, for example and without limitation, any suitable type of environment involving bill presentment and payment.

Although example aspects have been described in certain specific embodiments, many additional modifications and variations would be apparent to those skilled in the art. It thus should be understood that the example embodiments may be practiced in ways other than those specifically described. Again, the present example embodiments should be considered in all respects as illustrative and not restrictive.

It is also noted that similar reference numerals shown in the various figures represent the same elements, in one example embodiment herein. However, in another example embodiment herein the elements need not necessarily be the same and each separate figure can represent its own respective embodiment.

What is claimed is:

1. A method for accessing endpoint data through a federated directory system, comprising:
  receiving, from a requester, at a federated directory a request for endpoint data containing information associated with a particular party;
  identifying, by the federated directory, one or more industry directories containing endpoint data to which the federated directory has access, thereby identifying one or more identified industry directories;
  querying, by the federated directory, the one or more identified industry directories for the requested endpoint data;
  determining, based on the query, one or more identified industry directories that contain the requested endpoint data, thereby determining one or more determined industry directories;
  accessing pricing information from the one or more determined industry directories for a charge of providing the requested data from the one or more determined industry directories to the requestor;
  communicating to the requester, by the federated directory, the one or more determined industry directories containing the requested endpoint data and the pricing information for providing the requested endpoint data to the requester; and
  upon receiving a decision from the requester to proceed:
    retrieving the requested endpoint data from the one or more determined industry directories authorized by the requester;
    storing the retrieved endpoint data at the federated directory for access by the requester;
    correlating requester information from the requestor and payor information from the one or more determined industry directories;
    creating a payment transaction message charging for access to the requested endpoint data based on the correlating; and
    sending the payment transaction message to the requester, wherein a secure payment is received from the requester.

2. The method of claim 1, further comprising:
  including one or more pointers in the federated directory pointing to the one or more industry directories to which the federated directory has access; and
  accessing the one or more industry directories by the federated directory using the one or more pointers, wherein the one or more pointers can point to the pricing information stored in the industry directories.

3. The method of claim 1, wherein the determining also includes determining any requirements by the one or more industry directories for providing the requested endpoint data.

4. The method of claim 1, wherein the payment transaction is a request for payment message.

5. The method of claim 4, wherein the endpoint data includes at least one of a bank account number and a bank routing number.

6. The method of claim 5, further comprising routing the payment transaction message to a destination based on at least the bank routing number.

7. The method of claim 1, wherein if more than one industry directory is determined to contain the requested endpoint data, determining from the received decision which of the one or more determined industry directories is to be accessed to retrieve the requested endpoint data.

8. The method of claim 7, further comprising determining a charge for accessing the requested endpoint data based on the accessed pricing information from the one or more industry directories and based on the industry directories designated in the received decision.

9. A federated directory system, comprising:
  a federated directory;
  an interface in communication with the federated directory and a plurality of industry directories;
  a memory storing a program; and
  a computer processor, operating under control of the program, to perform:
    receiving, from a requester, at the federated directory a request for endpoint data containing information associated with a particular party;
    identifying, by the federated directory, one or more industry directories containing endpoint data to which the federated directory has access, thereby identifying one or more identified industry directories;
    querying, by the federated directory, the one or more identified industry directories for the requested endpoint data;

determining, based on the query, one or more identified industry directories that contain the requested endpoint data, thereby determining one or more determined industry directories;

accessing pricing information from the one or more determined industry directories for a charge of providing the requested data from the one or more determined industry directories to the requester;

communicating to the requester, by the federated directory, the one or more determined industry directories containing the requested endpoint data and the pricing information for providing the requested endpoint data to the requester; and upon receiving a decision from the requester to proceed:
retrieving the requested endpoint data from the one or more determined industry directories authorized by the requester;
storing the retrieved endpoint data at the federated directory for access by the requester;
correlating requester information from the requester and payor information from the one or more determined industry directories;
creating a payment transaction message charging for access to the requested endpoint data based on the correlating; and
sending the payment transaction message to the requester, wherein a secure payment is received from the requester.

10. The federated directory system of claim 9, wherein the computer processor, operating under control of the program, further performs:
including one or more pointers in the federated directory pointing to the one or more industry directories to which the federated directory has access; and
accessing the one or more industry directories by the federated directory using the one or more pointers,
wherein the one or more pointers can point to the pricing information stored in the industry directories.

11. The federated directory system of claim 9, wherein the determining also includes determining any requirements by the one or more industry directories for providing the endpoint data.

12. The federated directory system of claim 9, wherein the payment transaction is a request for payment message.

13. The federated directory system of claim 9, wherein if more than one industry directory is determined to contain the requested endpoint data, determining from the received decision which of the one or more determined industry directories is to be accessed to retrieve the requested endpoint data.

14. The federated directory system of claim 13, further comprising determining a charge for accessing the requested endpoint data based on the accessed pricing information from the one or more industry directories and based on the industry directories designated in the received decision.

15. A computer-readable medium storing a program having instructions which, when executed by a computer processor, cause the computer processor to perform a method for accessing a federated directory in a transaction system, comprising:

receiving, from a requester, at a federated directory a request for endpoint data containing information associated with a particular party;

identifying, by the federated directory, one or more industry directories containing endpoint data, to which the federated directory has access, thereby identifying one or more identified industry directories;

querying, by the federated directory, the one or more identified industry directories for the requested endpoint data;

determining, based on the query, one or more identified industry directories that contain the requested endpoint data, thereby determining one or more determined industry directories;

accessing pricing information from the one or more determined industry directories for a charge of providing the requested data to the requester from the one or more determined industry directories to the requester;

communicating to the requester, by the federated directory, the one or more determined industry directories containing the requested endpoint data and the pricing information for providing the requested endpoint data to the requester; and upon receiving a decision from the requester to proceed:
retrieving the requested endpoint data from the one or more determined industry directories authorized by the requester;
storing the retrieved endpoint data at the federated directory for access by the requester;
correlating requester information from the requester and payor information from the one or more determined industry directories;
creating a payment transaction message charging for access to the requested endpoint data based on the correlating; and
sending the payment transaction message to the requester, wherein a secure payment is received from the requester.

16. The method of claim 15, further comprising:
including one or more pointers in the federated directory pointing to the one or more industry directories to which the federated directory has access; and
accessing the one or more industry directories by the federated directory using the one or more pointers,
wherein the one or more pointers can point to the pricing information stored in the industry directories.

17. The method of claim 15, wherein the endpoint data includes at least one of a bank account number and a bank routing number.

18. The method of claim 17, further comprising routing the payment transaction message to a destination based on at least the bank routing number.

19. The method of claim 15, wherein if more than one industry directory is determined to contain the requested endpoint data, determining from the received decision which of the one or more determined industry directories is to be accessed to retrieve the requested endpoint data.

20. The method of claim 19, further comprising determining a charge for accessing the requested endpoint data based on the accessed pricing information from the one or more industry directories and based on the industry directories designated in the received decision.

* * * * *